United States Patent
Kim et al.

(10) Patent No.: US 12,085,497 B1
(45) Date of Patent: Sep. 10, 2024

(54) NANOPARTICLE ANALYSIS FOR ULTRA-LOW LEVEL CONCENTRATIONS OF NANOPARTICLES IN FLUID SAMPLES

(71) Applicants: Elemental Scientific, Inc., Omaha, NE (US); Samsung Electronics Co., Ltd., Suwon-si (KR)

(72) Inventors: Myung Hwan Kim, Omaha, NE (US); Daesung Kim, Omaha, NE (US); Austin Schultz, Omaha, NE (US); Cole Nardini, Omaha, NE (US); David Diaz, Omaha, NE (US); Kyle Uhlmeyer, Omaha, NE (US); Daniel R. Wiederin, Omaha, NE (US); Jaeyoung Kim, Suwon-si (KR); Min-Soo Suh, Suwon-si (KR); So Young Kim, Suwon-si (KR); Sooyeon Kim, Suwon-si (KR); Junghee Shin, Suwon-si (KR); Suyeon Jeong, Suwon-si (KR)

(73) Assignees: Elemental Scientific, Inc., Omaha, NE (US); Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 18/400,300

(22) Filed: Dec. 29, 2023

Related U.S. Application Data

(60) Provisional application No. 63/458,680, filed on Apr. 12, 2023.

(51) Int. Cl.
*G01N 15/1429* (2024.01)
*G01N 30/72* (2006.01)
(Continued)

(52) U.S. Cl.
CPC ......... *G01N 15/1429* (2013.01); *G01N 30/72* (2013.01); *H01J 49/105* (2013.01); *H01J 49/36* (2013.01); *G01N 2015/1029* (2024.01)

(58) Field of Classification Search
CPC .... H01J 49/105; H01J 49/36; G01N 15/1429; G01N 30/72; G01N 2015/1029
(Continued)

(56) References Cited

U.S. PATENT DOCUMENTS

| 7,488,935 B2 | 2/2009 | Altmayer |
| 8,626,449 B2 | 1/2014 | Prather et al. |

(Continued)

FOREIGN PATENT DOCUMENTS

| CN | 217158107 U | 8/2022 |
| JP | 2018141811 A | 9/2018 |

(Continued)

OTHER PUBLICATIONS

Hendriks, L. et al., "Performance of sp-ICP-TOFMS with signal distributions fitted to a compound Poisson model," Journal of Analytical Atomic Spectrometry, Jul. 25, 2019, pp. 1900-1909, vol. 34, issue 9.

(Continued)

*Primary Examiner* — Kiet T Nguyen
(74) *Attorney, Agent, or Firm* — Kevin E. West; Advent, LLP

(57) ABSTRACT

Systems and methods for analyzing ultra-low level concentration nanoparticles in semiconductor cleaning chemicals by single particle inductively coupled plasma mass spectrometry (spICP-MS) are described. In aspects, the methods described herein include determination factors that are specific to each of the chemical matrix and the type of analyte
(Continued)

associated with the nanoparticles present in a fluid sample for both a particle baseline intensity value and a nanoparticle detection threshold.

21 Claims, 28 Drawing Sheets

(51) Int. Cl.
*H01J 49/10* (2006.01)
*H01J 49/36* (2006.01)
*G01N 15/10* (2024.01)

(58) Field of Classification Search
USPC .................................................. 250/282, 281
See application file for complete search history.

(56) References Cited

U.S. PATENT DOCUMENTS

| | | | |
|---|---|---|---|
| 9,343,283 | B1 | 5/2016 | Field et al. |
| 9,754,774 | B2 | 9/2017 | Bazargan et al. |
| 9,865,443 | B2 | 1/2018 | Taniguchi |
| 10,854,438 | B2 | 12/2020 | Yamada et al. |
| 11,075,066 | B2 | 7/2021 | Itagaki et al. |
| 11,232,934 | B2 | 1/2022 | Moulds |
| 11,443,933 | B1 | 9/2022 | Yamada |
| 11,569,081 | B2 | 1/2023 | Kawabata et al. |
| 2011/0049353 | A1 | 3/2011 | Gilbert et al. |
| 2015/0235833 | A1* | 8/2015 | Bazargan ............ H01J 49/0036 702/189 |
| 2019/0341240 | A1* | 11/2019 | Wang ........................ G01N 1/38 |
| 2020/0103077 | A1 | 4/2020 | Wiederin et al. |
| 2020/0135443 | A1* | 4/2020 | Itagaki .................. H01J 49/105 |
| 2020/0266042 | A1 | 8/2020 | Geromanos et al. |
| 2021/0131918 | A1 | 5/2021 | Wiederin et al. |
| 2021/0181165 | A1 | 6/2021 | Lang et al. |

FOREIGN PATENT DOCUMENTS

| | | |
|---|---|---|
| JP | 2019100891 A | 6/2019 |
| JP | 6642125 B2 | 2/2020 |
| JP | 6695088 B1 | 5/2020 |
| KR | 101711081 B1 | 2/2017 |
| WO | 2015122920 A1 | 8/2015 |

OTHER PUBLICATIONS

Laborda, F. et al., "About detectability and limits of detection in single particle inductively coupled plasma mass spectrometry," Spectrochimica Acta Part B, Jul. 2020, pp. 1-11, vol. 169, Article No. 105883.

Mitrano, D., "Detecting Nanoparticulate Silver Using Single-Particle Inductively Coupled Plasma—Mass Spectrometry," Nanomaterials in the Environment, Environmental Toxicology and Chemistry, 2012, vol. 31, No. 1, pp. 115-121. (Accepted Apr. 17, 2011).

PCT International Search Report and Written Opinion for PCT/US2023/019427, dated Aug. 21, 2023.

PCT International Search Report and Written Opinion for PCT/US2023/019435, dated Aug. 7, 2023.

PCT International Search Report for PCT/US2023/019441, dated Aug. 7, 2023.

* cited by examiner

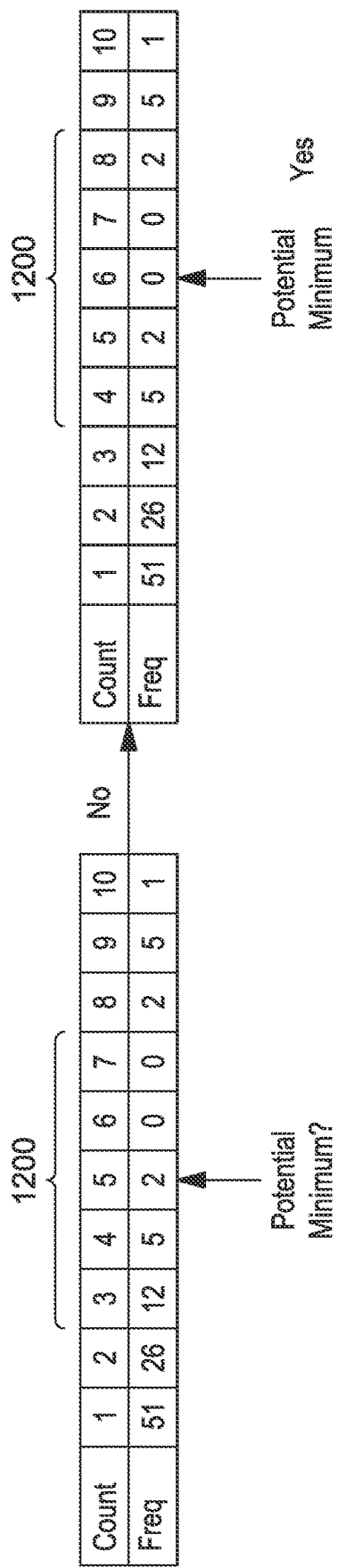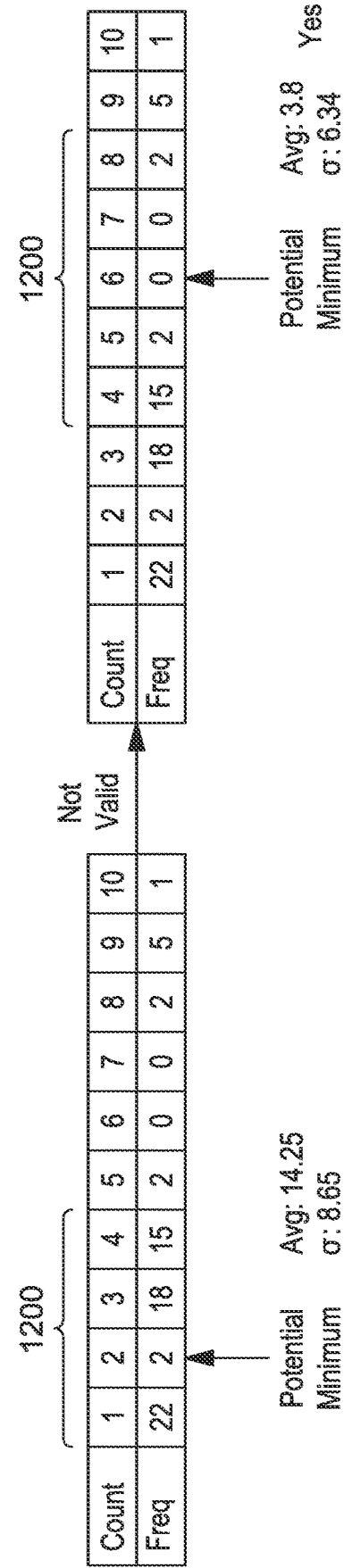

| STANDARD | | INSTRUMENT DEFAULT PROCESS | | | | PRESENT DISCLOSURE PROCESS | | | |
|---|---|---|---|---|---|---|---|---|---|
| IONIC CONTENT (PPT) | NP CONTENT (PPT) | # PARTICLES | MEAN SIZE (NM) | BASELINE (CPS) | DETECTION THRESHOLD | # PARTICLES | MEAN SIZE (NM) | BASELINE (CPS) | DETECTION THRESHOLD |
| 0 | 200 | 2193 | 100 | 77120 | 380000 | 2203 | 95 | 100989 | 190000 |
| 0 | 200 | 2164 | 95 | 74844 | 500000 | 2187 | 95 | 101616 | 180000 |
| 500 | 200 | 2111 | 101 | 88221 | 540000 | 2112 | 93 | 124897 | 290000 |
| 500 | 200 | 2207 | 101 | 95041 | 450000 | 2213 | 93 | 128610 | 200000 |
| 1000 | 200 | 2050 | 102 | 119808 | 650000 | 2088 | 93 | 162140 | 200000 |
| 1000 | 200 | 2079 | 92 | 119876 | 620000 | 2082 | 92 | 162305 | 260000 |
| 2000 | 200 | 1936 | 103 | 168323 | 660000 | 1800 | 92 | 224782 | 270000 |
| 2000 | 200 | 2253 | 104 | 178048 | 600000 | 2189 | 94 | 230706 | 300000 |
| 5000 | 200 | 336 | 138 | 347705 | 2630000 | 1740 | 98 | 434892 | 620000 |
| 5000 | 200 | 161 | 145 | 341010 | 3140000 | 2204 | 93 | 422334 | 340000 |
| RSD (%) | | 46 | 17 | | | 8 | 2 | | |

FIG. 19

| 3,3,1,7 - Si IN NH₄OH | | | | 5,1,7 - Si IN NH₄OH | | | | 7,1,7 - Si IN NH₄OH | | |
|---|---|---|---|---|---|---|---|---|---|---|
| ITERATION | # PARTICLES | BASELINE (CPS) | DETECTION THRESHOLD | ITERATION | # PARTICLES | BASELINE (CPS) | DETECTION THRESHOLD | ITERATION | # PARTICLES | BASELINE (CPS) | DETECTION THRESHOLD |
| 1 | 1,548 | 394,991 | 290,000 | 1 | 1,384 | 398,167 | 530,000 | 1 | 1,559 | 402,967 | 250,000 |
| 2 | 1,311 | 396,683 | 390,000 | 2 | 1,353 | 399,691 | 320,000 | 2 | 1,366 | 404,062 | 290,000 |
| 3 | 1,350 | 398,184 | 410,000 | 3 | 1,352 | 401,233 | 390,000 | 3 | 1,335 | 405,823 | 420,000 |
| 4 | 1,307 | 398,086 | 370,000 | 4 | 1,332 | 401,102 | 330,000 | 4 | 1,335 | 405,477 | 310,000 |
| 5 | 1,200 | 396,163 | 510,000 | 5 | 1,303 | 399,023 | 290,000 | 5 | 1,200 | 402,921 | 450,000 |
| 6 | 1,400 | 394,883 | 510,000 | 6 | 1,450 | 398,302 | 310,000 | 6 | 1,404 | 403,822 | 420,000 |
| 7 | 1,627 | 398,135 | 400,000 | 7 | 1,627 | 401,980 | 380,000 | 7 | 1,586 | 407,992 | 660,000 |
| 8 | 1,376 | 395,622 | 450,000 | 8 | 1,395 | 398,863 | 370,000 | 8 | 1,404 | 403,934 | 330,000 |
| 9 | 1,358 | 393,141 | 310,000 | 9 | 1,350 | 396,049 | 300,000 | 9 | 1,273 | 400,840 | 510,000 |
| 10 | 1,194 | 395,194 | 620,000 | 10 | 1,224 | 397,978 | 360,000 | 10 | 1,230 | 402,075 | 330,000 |
| 11 | 1,385 | 386,337 | 330,000 | 11 | 1,295 | 389,413 | 470,000 | 11 | 1,280 | 393,981 | 570,000 |
| 12 | 1,503 | 392,747 | 480,000 | 12 | 1,501 | 396,748 | 440,000 | 12 | 1,501 | 402,189 | 410,000 |
| AVR | 1,380 | 395,014 | 422,500 | AVR | 1,381 | 398,212 | 374,167 | AVR | 1,373 | 403,007 | 412,500 |
| RSD | 9.35% | 0.83% | 22.75% | RSD | 7.66% | 0.83% | 19.72% | RSD | 9.06% | 0.85% | 29.48% |

FIG. 20

| 5,1, 7 - Si IN NH$_4$OH | |
|---|---|
| ITERATION | # PARTICLES |
| 1 | 1640 |
| 2 | 2665 |
| 3 | 1354 |
| 4 | 1781 |
| 5 | 1096 |
| 6 | 1499 |
| 7 | 2072 |
| 8 | 1935 |
| AVR | 1,755 |
| RSD | 27.54% |

| 5,2, 7 - Si IN NH$_4$OH | |
|---|---|
| ITERATION | # PARTICLES |
| 1 | 379 |
| 2 | 1544 |
| 3 | 795 |
| 4 | 1384 |
| 5 | 1094 |
| 6 | 982 |
| 7 | 624 |
| 8 | 986 |
| AVR | 974 |
| RSD | 39.14% |

| 5,3, 7 - Si IN NH$_4$OH | |
|---|---|
| ITERATION | # PARTICLES |
| 1 | 419 |
| 2 | 683 |
| 3 | 478 |
| 4 | 603 |
| 5 | 456 |
| 6 | 727 |
| 7 | 279 |
| 8 | 681 |
| AVR | 541 |
| RSD | 29.07% |

FIG. 21

| 5,1, 7 - Si IN NH$_4$OH | |
|---|---|
| ITERATION | # PARTICLES |
| 1 | 1,384 |
| 2 | 1,353 |
| 3 | 1,352 |
| 4 | 1,332 |
| 5 | 1,303 |
| 6 | 1,450 |
| 7 | 1,627 |
| 8 | 1,395 |
| 9 | 1,350 |
| 10 | 1,224 |
| 11 | 1,295 |
| 12 | 1,501 |
| AVR | 1,381 |
| RSD | 7.66% |

| 5,1, 9 - Si IN NH$_4$OH | |
|---|---|
| ITERATION | # PARTICLES |
| 1 | 1,373 |
| 2 | 1,353 |
| 3 | 1,352 |
| 4 | 1,339 |
| 5 | 1,199 |
| 6 | 1,398 |
| 7 | 1,627 |
| 8 | 1,395 |
| 9 | 1,265 |
| 10 | 1,208 |
| 11 | 1,295 |
| 12 | 1,512 |
| AVR | 1,360 |
| RSD | 8.87% |

| 5,1, 11 - Si IN NH$_4$OH | |
|---|---|
| ITERATION | # PARTICLES |
| 1 | 1,381 |
| 2 | 1,311 |
| 3 | 1,362 |
| 4 | 1,260 |
| 5 | 1,199 |
| 6 | 1,392 |
| 7 | 1,627 |
| 8 | 1,376 |
| 9 | 1,265 |
| 10 | 1,208 |
| 11 | 1,295 |
| 12 | 1,501 |
| AVR | 1,348 |
| RSD | 9.11% |

| 1,3,5 - Si IN IPA | |
|---|---|
| ITERATION | # PARTICLES |
| 1 | 4,449 |
| 2 | 4,407 |
| 3 | 4,440 |
| 4 | 3,729 |
| 5 | 3,920 |
| 6 | 4,290 |
| 7 | 4,816 |
| 8 | 4,503 |
| 9 | 3,940 |
| 10 | 3,985 |
| 11 | 3,982 |
| 12 | 4,214 |
| AVR | 4,223 |
| RSD | 7.48% |

| 5,1,7 - Si IN IPA | |
|---|---|
| ITERATION | # PARTICLES |
| 1 | 1,302 |
| 2 | 222 |
| 3 | 2,385 |
| 4 | 146 |
| 5 | 978 |
| 6 | 1,557 |
| 7 | 3,825 |
| 8 | 687 |
| 9 | 4,101 |
| 10 | 4,022 |
| 11 | 2,407 |
| 12 | 122 |
| AVR | 1,813 |
| RSD | 83.66% |

| 5,1,11 - Si IN $H_2O_2$ | |
|---|---|
| ITERATION | # PARTICLES |
| 1 | 1,255 |
| 2 | 1,256 |
| 3 | 1,248 |
| 4 | 1,212 |
| 5 | 1,399 |
| 6 | 1,094 |
| 7 | 1,224 |
| 8 | 1,159 |
| 9 | 1,145 |
| 10 | 1,138 |
| 11 | 1,285 |
| 12 | 1,361 |
| AVR | 1,231 |
| RSD | 7.34% |

| 5,1,7 - Si IN $H_2O_2$ | |
|---|---|
| ITERATION | # PARTICLES |
| 1 | 1,689 |
| 2 | 1,219 |
| 3 | 1,299 |
| 4 | 1,298 |
| 5 | 1,345 |
| 6 | 1,116 |
| 7 | 1,171 |
| 8 | 1,169 |
| 9 | 1,111 |
| 10 | 1,095 |
| 11 | 12,042 |
| 12 | 1,580 |
| AVR | 2,178 |
| RSD | 142.89% |

| 5,1,7 - Si IN $NH_4OH$ | |
|---|---|
| ITERATION | # PARTICLES |
| 1 | 1,384 |
| 2 | 1,353 |
| 3 | 1,352 |
| 4 | 1,332 |
| 5 | 1,303 |
| 6 | 1,450 |
| 7 | 1,627 |
| 8 | 1,395 |
| 9 | 1,350 |
| 10 | 1,224 |
| 11 | 1,295 |
| 12 | 1,501 |
| AVR | 1,381 |
| RSD | 7.66% |

5,1,7 - Si IN NH$_4$OH

| ITERATION | # PARTICLES |
|---|---|
| 1 | 1,384 |
| 2 | 1,353 |
| 3 | 1,352 |
| 4 | 1,332 |
| 5 | 1,303 |
| 6 | 1,450 |
| 7 | 1,627 |
| 8 | 1,395 |
| 9 | 1,350 |
| 10 | 1,224 |
| 11 | 1,295 |
| 12 | 1,501 |
| AVR | 1,381 |
| RSD | 7.66% |

5,1,7 - Fe IN NH$_4$OH

| ITERATION | # PARTICLES |
|---|---|
| 1 | 325 |
| 2 | 308 |
| 3 | 303 |
| 4 | 334 |
| 5 | 265 |
| 6 | 145 |
| 7 | 235 |
| 8 | 196 |
| 9 | 241 |
| 10 | 333 |
| 11 | 231 |
| 12 | - |
| AVR | 265 |
| RSD | 23.28% |

7,1,3 - Fe IN NH$_4$OH

| ITERATION | # PARTICLES |
|---|---|
| 1 | 215 |
| 2 | 296 |
| 3 | 277 |
| 4 | 335 |
| 5 | 267 |
| 6 | 246 |
| 7 | 241 |
| 8 | 233 |
| 9 | 240 |
| 10 | 293 |
| 11 | 232 |
| 12 | - |
| AVR | 261 |
| RSD | 13.70% |

5,1,7 - Au IN NH$_4$OH

| ITERATION | # PARTICLES |
|---|---|
| 1 | 269 |
| 2 | 360 |
| 3 | 2,886 |
| 4 | 2,510 |
| 5 | 257 |
| 6 | 66 |
| 7 | 1,397 |
| 8 | 107 |
| 9 | 59 |
| 10 | 2,086 |
| 11 | 68 |
| 12 | 2,522 |
| AVR | 1,049 |
| RSD | 109.01% |

7,1,7 - Au IN NH$_4$OH

| ITERATION | # PARTICLES |
|---|---|
| 1 | 1,974 |
| 2 | 2,988 |
| 3 | 2,952 |
| 4 | 2,660 |
| 5 | 2,867 |
| 6 | 2,526 |
| 7 | 2,965 |
| 8 | 2,522 |
| 9 | 2,352 |
| 10 | 2,051 |
| 11 | 2,425 |
| 12 | 2,351 |
| AVR | 2,553 |
| RSD | 13.54% |

FIG. 24

| 1, 3, 5 - Si IN IPA | | 2, 3, 5 - Si IN IPA | | 3, 3, 5 - Si IN IPA | |
|---|---|---|---|---|---|
| ITERATION | # PARTICLES | ITERATION | # PARTICLES | ITERATION | # PARTICLES |
| 1 | 4341 | 1 | 2,617 | 1 | 1,747 |
| 2 | 4490 | 2 | 509 | 2 | 2,208 |
| 3 | 4149 | 3 | 2,606 | 3 | 2,773 |
| 4 | 4411 | 4 | 2,741 | 4 | 1,720 |
| 5 | 4275 | 5 | 849 | 5 | 1,524 |
| 6 | 4391 | 6 | 2,959 | 6 | 1,908 |
| 7 | 3870 | 7 | 2,075 | 7 | 2,092 |
| 8 | 4419 | 8 | 3,330 | 8 | 331 |
| AVR | 4,293 | AVR | 2,211 | AVR | 1,788 |
| RSD | 4.66% | RSD | 45.82% | RSD | 39.28% |

| 1, 1, 5 - Si IN IPA | | 1, 2, 5 - Si IN IPA | | 1, 3, 5 - Si IN IPA | |
|---|---|---|---|---|---|
| ITERATION | # PARTICLES | ITERATION | # PARTICLES | ITERATION | # PARTICLES |
| 1 | 3683 | 1 | 2206 | 1 | 4341 |
| 2 | 4021 | 2 | 4174 | 2 | 4490 |
| 3 | 4033 | 3 | 3094 | 3 | 4149 |
| 4 | 4669 | 4 | 4432 | 4 | 4411 |
| 5 | 4825 | 5 | 2636 | 5 | 4275 |
| 6 | 4103 | 6 | 4101 | 6 | 4391 |
| 7 | 4612 | 7 | 3985 | 7 | 3870 |
| 8 | 4484 | 8 | 4214 | 8 | 4419 |
| AVR | 4,304 | AVR | 3,605 | AVR | 4,293 |
| RSD | 9.26% | RSD | 23.27% | RSD | 4.66% |

FIG. 25

| 1, 3, 5 - Si IN IPA | | 1, 3, 7 - Si IN IPA | | 1, 3, 9 - Si IN IPA | |
|---|---|---|---|---|---|
| ITERATION | # PARTICLES | ITERATION | # PARTICLES | ITERATION | # PARTICLES |
| 1 | 4341 | 1 | 1,015 | 1 | 1,197 |
| 2 | 4490 | 2 | 2,175 | 2 | 662 |
| 3 | 4149 | 3 | 743 | 3 | 743 |
| 4 | 4411 | 4 | 2,635 | 4 | 2,118 |
| 5 | 4275 | 5 | 4,275 | 5 | 2,533 |
| 6 | 4391 | 6 | 4,104 | 6 | 3,631 |
| 7 | 3870 | 7 | 4,078 | 7 | 904 |
| 8 | 4419 | 8 | 1,648 | 8 | 1,648 |
| AVR | 4,293 | AVR | 2,584 | AVR | 1,680 |
| RSD | 4.66% | RSD | 55.31% | RSD | 61.54% |

FIG. 25 (CONTINUED)

| REFERENCE MATERIAL | ANALYTE OF INTEREST | CHEMICAL MATRIX | | | | |
|---|---|---|---|---|---|---|
| | | $H_2SO_4$ | $H_2SO_4$ + $H_2O_2$ + HF | $H_2O_2$ | $NH_4OH$ | IPA |
| 20NM Fe | Na | 7, 1, 11 | 5, 1, 7 | 5, 1, 7 | 7, 1, 7 | 9, 1, 3 |
| | Al | | | | | |
| | Ca | | | | | |
| | Fe | | | | | |
| | Ni | | | | | |
| | Cu | | | | | |
| | Cr | | | | | |
| | Zn | | | | | |
| 20NM Au | Au | 5, 1, 3 | 5, 1, 3 | 9, 1, 3 | 7, 1, 3 | 7, 1, 3 |
| 100,200NM Si | Si | 5, 1, 7 | 3, 1, 9 | 11, 1, 9 | 5, 1, 7 | 1, 3, 5 |

NANOPARTICLE ANALYSIS FOR ULTRA-LOW LEVEL CONCENTRATIONS OF NANOPARTICLES IN FLUID SAMPLES

CROSS-REFERENCE TO RELATED APPLICATIONS

The present application claims the benefit of 35 U.S.C. § 119(e) of U.S. Provisional Application Ser. No. 63/458,680, filed Apr. 12, 2023, and titled "NANOPARTICLE ANALYSIS FOR ULTRA-LOW LEVEL CONCENTRATIONS OF NANOPARTICLES IN FLUID SAMPLES." U.S. Provisional Application Ser. No. 63/458,680 is herein incorporated by reference in its entirety.

JOINT RESEARCH AGREEMENT

At least a portion of the present disclosure was developed pursuant to a joint research agreement between Samsung Electronics Co., Ltd. and Elemental Scientific Inc.

BACKGROUND

Inductively Coupled Plasma (ICP) spectrometry is an analysis technique commonly used for the determination of trace element concentrations and isotope ratios in liquid samples. ICP spectrometry employs electromagnetically generated partially ionized argon plasma which reaches a temperature of approximately 7,000K. When a sample is introduced to the plasma, the high temperature causes sample atoms to become ionized or emit light. Since each chemical element produces a characteristic mass or emission spectrum, measuring the spectra of the emitted mass or light allows the determination of the elemental composition of the original sample.

Sample introduction systems may be employed to introduce the liquid samples into the ICP spectrometry instrumentation (e.g., an Inductively Coupled Plasma Mass Spectrometer (ICP/ICP-MS), an Inductively Coupled Plasma Atomic Emission Spectrometer (ICP-AES), or the like) for analysis. For example, a sample introduction system may transport an aliquot of sample to a nebulizer that converts the aliquot into a polydisperse aerosol suitable for ionization in plasma by the ICP spectrometry instrumentation. The aerosol generated by the nebulizer is then sorted in a spray chamber to remove the larger aerosol particles. Upon leaving the spray chamber, the aerosol is introduced into the plasma by a plasma torch assembly of the ICP-MS or ICP-AES instruments for analysis.

SUMMARY

Systems and methods for analyzing ultra-low level concentration nanoparticles in semiconductor cleaning chemicals by single particle inductively coupled plasma mass spectrometry (spICP-MS) are described. In an aspect, a method for analyzing ultra-low level concentration nanoparticles in semiconductor cleaning chemicals by spICP-MS includes, but is not limited to, obtaining, via a processor in a computing device, an initial data set corresponding to ion signal intensity as a function of time of a sample processed by a spICP-MS system, the sample having a chemical matrix associated with a semiconductor cleaning chemical with an ultra-low level concentration of nanoparticles; determining, via the processor, a particle baseline intensity value to isolate signal intensities associated with the nanoparticles from data background signal intensities through iteratively filtering the initial data set, wherein iteratively filtering the dataset includes: determining, via the processor, a pulse count distribution of the initial data set corresponding to a plurality of data points, each data point corresponding to an ion signal intensity and a frequency of the ion signal intensity detected by the spICP-MS system; and iteratively removing from the pulse count distribution pulse count, via the processor, data points that exceed a particle threshold value associated with a sum of a first multiple of an average of the pulse count distribution and a first multiple of a standard deviation of the pulse count distribution, wherein subsequent iterations adjust the particle threshold value based on the removed pulse count data points until no pulse count data points exceed the particle threshold value to provide a resultant pulse count distribution, wherein the particle baseline intensity value corresponds to a sum of a second multiple of an average of the resultant pulse count distribution and a second multiple of a standard deviation of the resultant pulse count distribution, wherein each of the first multiple of the average, the first multiple of the standard deviation, the second multiple of the average, and the second multiple of the standard deviation are specific to each of the chemical matrix and a type of analyte associated with the nanoparticles; subtracting, via the processor, the particle baseline intensity value from the pulse count distribution to provide a baseline data set; integrating, via the processor, contiguous data points of the baseline data set within a specified time period and forming a histogram of the integrated contiguous data points; and determining, via the processor, a nanoparticle detection threshold through local window analysis of frequency values for counts associated with a window width of the histogram, wherein the window width is specific to each of the chemical matrix and a type of analyte associated with the nanoparticles.

In an aspect, a system for analyzing ultra-low level concentration nanoparticles in semiconductor cleaning chemicals by spICP-MS includes, but is not limited to, an inductively coupled plasma mass spectrometer (ICP-MS) configured to generate an initial data set corresponding to ion signal intensity as a function of time of a sample processed by the ICP-MS, the sample having a chemical matrix associated with a semiconductor cleaning chemical with an ultra-low level concentration of nanoparticles; a processor; and a non-transitory computer-readable medium bearing one or more instructions for execution on the processor to cause the processor to perform one or more of the methods described herein.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures. In the figures, the use of the same reference numbers in different instances in the description and the figures may indicate similar or identical items.

FIG. 13 is a schematic illustration of determining whether data points from a histogram of the spectrometry data are potential local minimum data points for an example window size.

FIG. 14 is a schematic illustration of validating potential local minimum data points from a histogram of the spectrometry data are potential local minimum data points for an example window size.

FIG. 19 is a table illustrating results of analysis of a spectrometry dataset related to an ultra-low concentration of nanoparticles in a semiconductor cleaning fluid by a conventional ICPMS instrument-default process and in accordance with example implementations of the present disclosure.

FIG. 20 is a plurality of tables illustrating results of analysis of a spectrometry dataset related to an ultra-low concentration of silicon nanoparticles in ammonium hydroxide in accordance with example implementations of the present disclosure.

FIG. 21 is a plurality of tables illustrating results of analysis of a spectrometry dataset related to an ultra-low concentration of silicon nanoparticles in ammonium hydroxide in accordance with example implementations of the present disclosure.

FIG. 22 is a plurality of tables illustrating results of analysis of a spectrometry dataset related to an ultra-low concentration of silicon nanoparticles in ammonium hydroxide in accordance with example implementations of the present disclosure.

FIG. 23 is a plurality of tables illustrating results of analysis of a spectrometry dataset related to an ultra-low concentration of silicon nanoparticles in ammonium hydroxide, hydrogen peroxide, or isopropyl alcohol in accordance with example implementations of the present disclosure.

FIG. 24 is a plurality of tables illustrating results of analysis of a spectrometry dataset related to an ultra-low concentration of silicon, iron, or gold nanoparticles in ammonium hydroxide in accordance with example implementations of the present disclosure.

FIG. 25 is a plurality of tables illustrating results of analysis of a spectrometry dataset related to an ultra-low concentration of silicon nanoparticles in isopropyl alcohol in accordance with example implementations of the present disclosure.

DETAILED DESCRIPTION

Overview

Figure 1A:
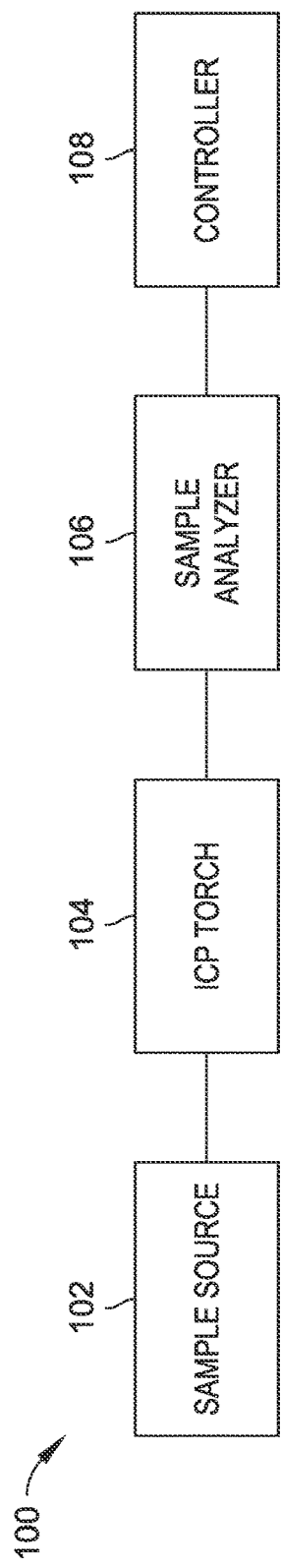
FIG. 1A is a schematic illustration of a system for analysis of nanoparticles in accordance with example implementations of the present disclosure.

Nanoparticle research and use of nanoparticles (e.g., particles of less than about 1000 nm in diameter) in various commercial, environmental, and medical fields has grown to encompass numerous applications. Such applications can focus on capabilities to detect nanoparticles and to calculate the sizes of nanoparticles present in a sample. However, determining what is a nanoparticle and what is not a nanoparticle when analyzing spectrometry data poses many challenges. For instance, spectrometry data, such as ICPMS data, includes information associated with ionized samples and background interference, such as resulting from plasma gases introduced to the ICP torch, that can overlap with data associated with small nanoparticles (e.g., data for identification of nanoparticles, determination of the number of nanoparticles and their associated size distributions, etc.).

As the size of the nanoparticle decreases, the spectrometry data of the nanoparticle begins to converge with data associated with ionic species produced by the ICP torch, such as ionized carrier gases or plasma gases. This overlap and the associated challenges with removing background interferences, while avoiding nanoparticle data removal, lead to continued problems in providing reliable data associated with nanoparticles present in fluids at ultra-low concentrations, where even small deviations in separating nanoparticles from background interferences or from ionic background data can lead to large errors in nanoparticle determinations, to high levels of variance between data sets, and to reduced confidence intervals for data generated.

Accordingly, the present disclosure is directed, at least in part, to systems and methods for analyzing ultra-low level concentration nanoparticles in semiconductor cleaning chemicals by single particle inductively coupled plasma mass spectrometry (spICP-MS). The nanoparticles can be associated with specific reference materials, specific analytes of interest, and specific chemical matrices in which the nanoparticles are suspended. In aspects, the methods described herein include determination factors that are specific to each of the chemical matrix and the type of analyte associated with the nanoparticles present in a fluid sample for both a particle baseline intensity value and a nanoparticle detection threshold.

Example Implementations

Referring generally to FIGS. 1A through 28, a process is shown for analyzing ultra-low level concentration nanoparticles in semiconductor cleaning chemicals by single particle inductively coupled plasma mass spectrometry (spICP-MS) with the determination of chemical species-specific and chemical matrix-specific nanoparticle baseline and nanoparticle detection thresholds in accordance with example implementations of the present disclosure. The instant disclosure provides description of an example system for analysis of nanoparticles in FIGS. 1A and 1B, of example data processes in FIGS. 2 through 14, with an iterative determination data process described with respect to FIGS. 2 through 9B and a local minimum data process described with respect to FIGS. 10 through 15, and a description of determining particular chemical species-specific and chemical matrix-specific nanoparticle baseline and nanoparticle detection thresholds with respect to FIGS. 16 through 28.

Figure 1B:
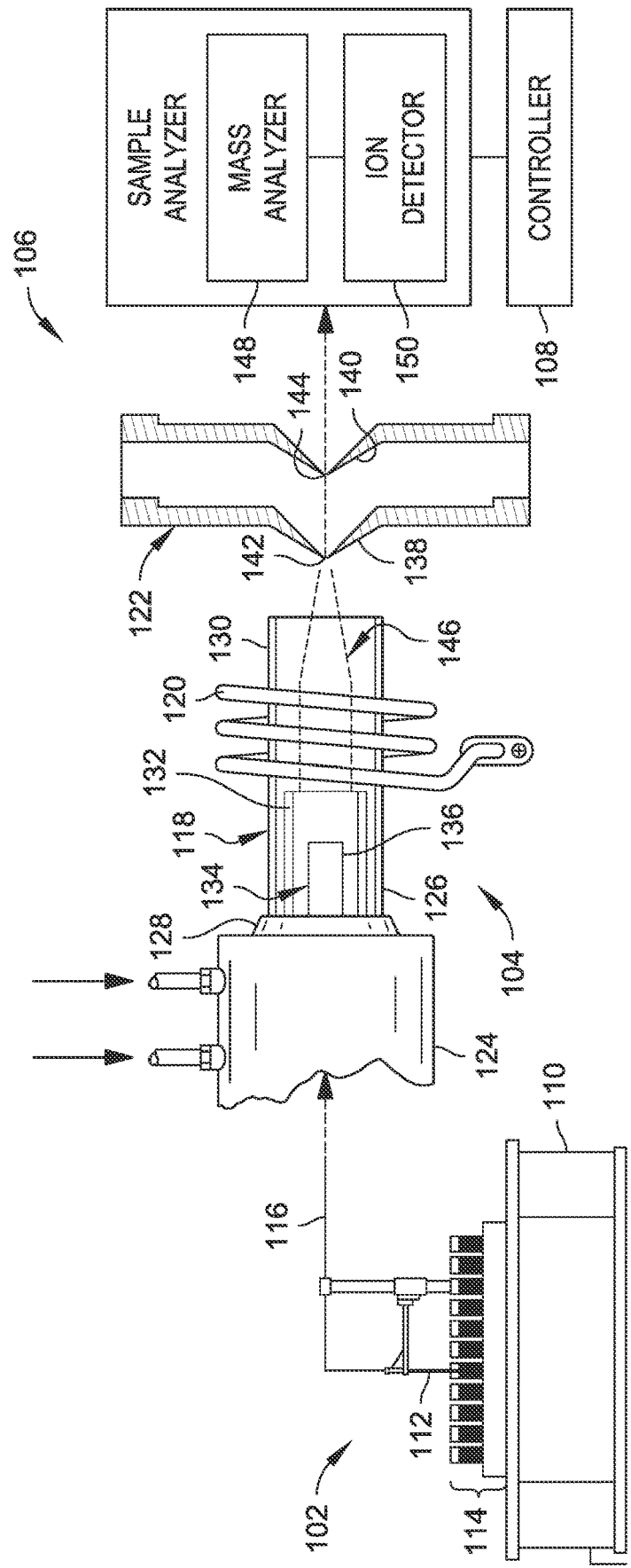
FIG. 1B is a partial diagrammatic illustration of the system of FIG. 1A in accordance with example implementations of the present disclosure.

Referring to FIGS. 1A and 1B, a system 100 for analysis of nanoparticles contained in fluid samples is shown in accordance with example implementations of the present disclosure. The system 100 generally includes a sample source 102, an inductively coupled plasma (ICP) torch 104, a sample analyzer 106, and a controller 108. The sample source 102 supplies a fluid sample containing nanoparticles for analysis by the sample analyzer 106 and can include, for example, an autosampler (e.g., autosampler 110 shown in FIG. 1B) to automate fluid handling of the sample. For instance, the autosampler 110 manipulates a sample probe 112 to draw fluid samples held in fluid containers 114 (e.g., sample vials, sample bottles, etc.) and transfer the fluid samples from the autosampler to other portions of the system, such as through vacuum transfer, pump transfer, or the like. The samples can include fluids containing nanoparticles of interest, diluents, sample matrix components, components for generation of calibration curves (e.g., standard fluids, standard nanoparticles, etc.), or the like, or combinations thereof. In implementations, the controller 108 facilitates control of one or more aspects of the fluid transfer from the autosampler 110. In implementations, the controller 108 includes a computer processor communicatively coupled with a computer memory to access control programming associated with one or more processes described herein for execution by the computer processor.

The sample source 102 is fluidically coupled with the ICP torch 104 (e.g., via a fluid transfer line 116) to transfer the fluid sample containing nanoparticles to the ICP torch 104 for ionization of the sample for analysis by the sample analyzer 106. In implementations, the sample source 102 includes one or more sample conditioning systems to prepare the fluid sample for introduction to the ICP torch 104. For example, the sample source 102 can include a nebulizer to receive the fluid sample from the autosampler 110 and aerosolize the fluid sample and a spray chamber to receive the aerosolized sample from the nebulizer and remove larger aerosol components through impact against spray chamber walls. The sample source 102 can thus condition the fluid sample to promote substantially continuous operation of the ICP torch 104 for sample ionization, such as by aerosolizing the sample and removing larger aerosol components to prevent extinguishing of the plasma generated by the ICP torch 104.

An example ICP torch 104 is shown in FIG. 1B, where the system is shown including a plasma torch assembly 118, a radio frequency (RF) induction coil 120 that is coupled to an RF generator (not shown), and an interface 122. The plasma torch assembly 118 includes a housing 124 that receives a plasma torch 126 configured to sustain the plasma. The plasma torch 126 is shown including a torch body 128, a first (outer) tube 130, a second (intermediate) tube 132, and an injector assembly 134 which includes a third (injector) tube 136. The plasma torch 126 is mounted by the housing 124 for positioning centrally in the RF induction coil 120 so that the end of the first (outer) tube 130 is adjacent to (e.g., approximately 10-20 mm from) the interface 122. The interface 122, which can be included in the sample analyzer 106 or as a separate component thereof, generally includes a sampler cone 138 positioned adjacent to the plasma and a skimmer cone 140 positioned adjacent to the sampler cone 138, opposite the plasma. A small diameter opening 142, 144 is formed in each cone 138, 140 at the apex of the cone 138, 140 to allow the passage of ions from the inductively coupled plasma for analysis by the sample analyzer 106.

A flow of gas (e.g., the plasma-forming gas), which is used to form the plasma (e.g., plasma 146), is passed between the first (outer) tube 130 and the second (intermediate) tube 132. A second flow of gas (e.g., the auxiliary gas) is passed between the second (intermediate) tube 132 and the third (injector) tube 136 of the injector assembly 134. The second flow of gas can be used to change the position of the base of the plasma relative to the ends of the second (intermediate) tube 132 and the third (injector) tube 136. In implementations, the plasma-forming gas and the auxiliary gas include argon (Ar), however other gases may be used instead of or in addition to argon (Ar), in specific implementations. The RF induction coil 120 surrounds the first (outer) tube 130 of the plasma torch 126. RF power (e.g., 750-1500 W) is applied to the coil 120 to generate an alternating current within the coil 120. Oscillation of this alternating current (e.g., 27 MHz, 40 MHz, etc.) causes an electromagnetic field to be created in the plasma-forming gas within the first (outer) tube 130 of the plasma torch 126 to form an ICP discharge through inductive coupling. A carrier gas is then introduced into the third (injector) tube 136 of the injector assembly 134. The carrier gas passes through the center of the plasma, where it forms a channel that is cooler than the surrounding plasma. Samples to be analyzed are introduced into the carrier gas for transport into the plasma region, where the samples can be formed into an aerosol of liquid by passing the liquid sample from the sample source 102 into a nebulizer. As a droplet of nebulized sample enters the central channel of the ICP, it evaporates and any solids that were dissolved or carried in the liquid vaporize and then break down into atoms. In implementations, the carrier gas includes argon (Ar), however, other gases may be used instead of, or in addition to, argon (Ar) in specific implementations.

The sample analyzer 106 generally includes a mass analyzer 148 and an ion detector 150 to analyze the ions received from the ICP torch 104. For example, the sample analyzer 106 can direct ions received from the plasma of the ICP torch 104 and directed through the cones 138, 140 to the mass analyzer 148. The sample analyzer 106 can include various ion conditioning components, including, but not limited to, ion guides, vacuum chambers, reaction cells, and the like, suitable for operation of an ICPMS system. The mass analyzer 148 separates ions based on differing mass to charge ratios (m/z). For instance, the mass analyzer 148 can include a quadrupole mass analyzer, a time of flight mass analyzer, or the like. The ion detector 150 receives the separated ions from the mass analyzer 148 to detect and count ions according to the separated m/z ratios and output a detection signal. The controller 108 can receive the detection signal from the ion detector 150 to coordinate data for determination of the concentration of components in the ionized sample according to intensity of the signals of each ion detected by the ion detector 150 and for the determination of nanoparticle characteristics for nanoparticles contained in the fluid sample (e.g., nanoparticle size, nanoparticle amount, etc.).

Figure 2:
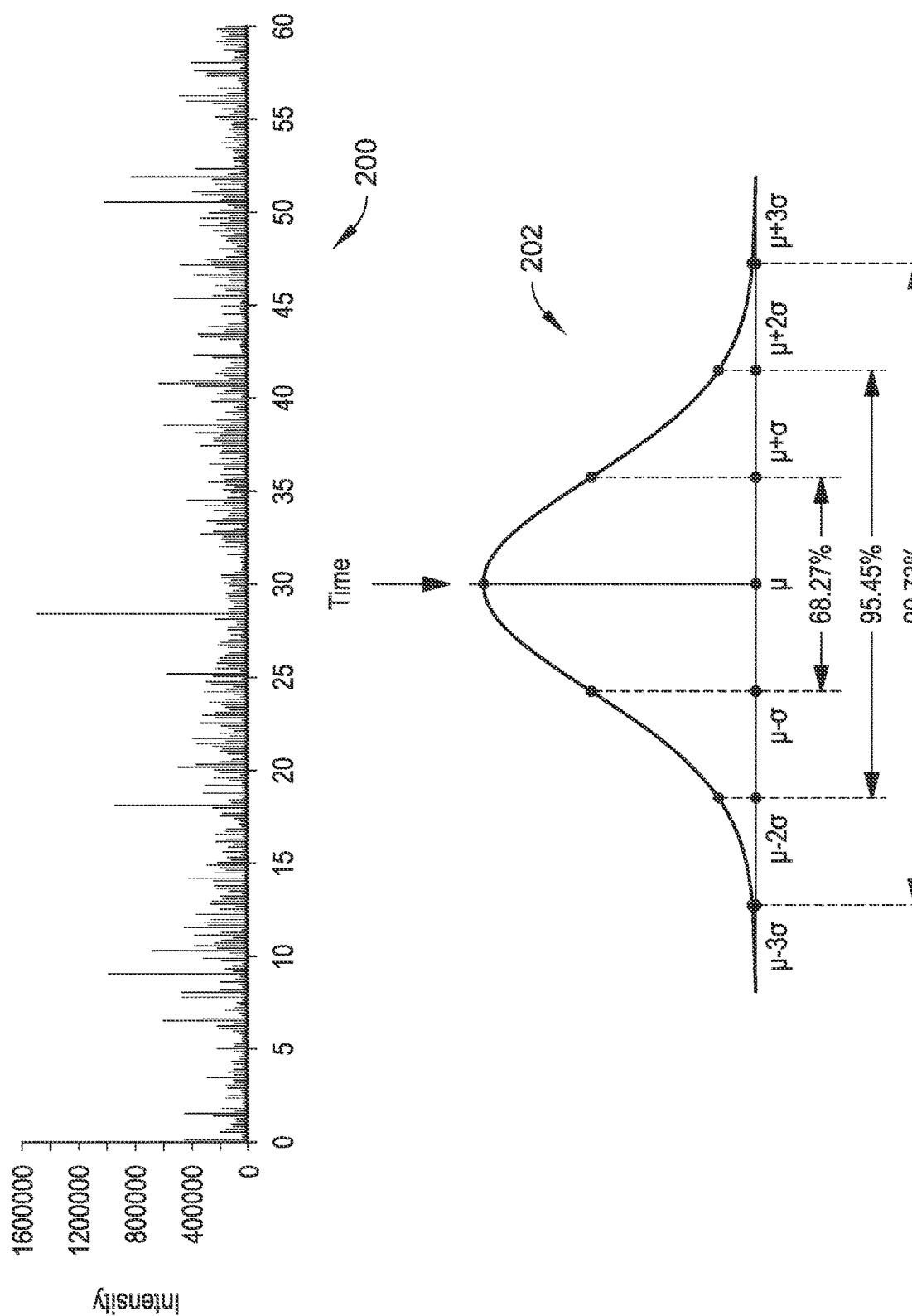
FIG. 2 is a schematic illustration of a spectrometry data set shown with a normal distribution curve in accordance with example implementations of the present disclosure.

An example spectroscopy data set from the controller 108 is shown in FIG. 2, where a spectrometry data set 200 is shown with a normal distribution curve 202. Ionic content present in a sample analyzed by ICPMS is generally homogenous. The processes described herein can proceed as though the ionic signals resemble a normal distribution centered around the average signal. For example, in the example spectrometry data set 200, ionic signals within one standard deviation from the average (i.e., $\mu \pm \sigma$) account for 68.27% of all the ionic signals, whereas ionic signals within two standard deviations from the average (i.e., $\mu \pm 2\sigma$) account for 95.45% of all the ionic signals, and ionic signals within three standard deviations from the average (i.e., $\mu \pm 3\sigma$) account for 99.73% of all the ionic signals. Outliers from the distribution are potentially nanoparticles present in the sample analyzed by the ICPMS. However, outliers can skew the standard deviation of the spectrometry dataset, so the processes described herein iteratively remove outliers from the dataset. For instance, example processes are described herein that iteratively remove outlier data from spectrometry data sets to determine particle baseline and a detection threshold for nanoparticles in accordance with example implementations of the present disclosure.

Figure 3:
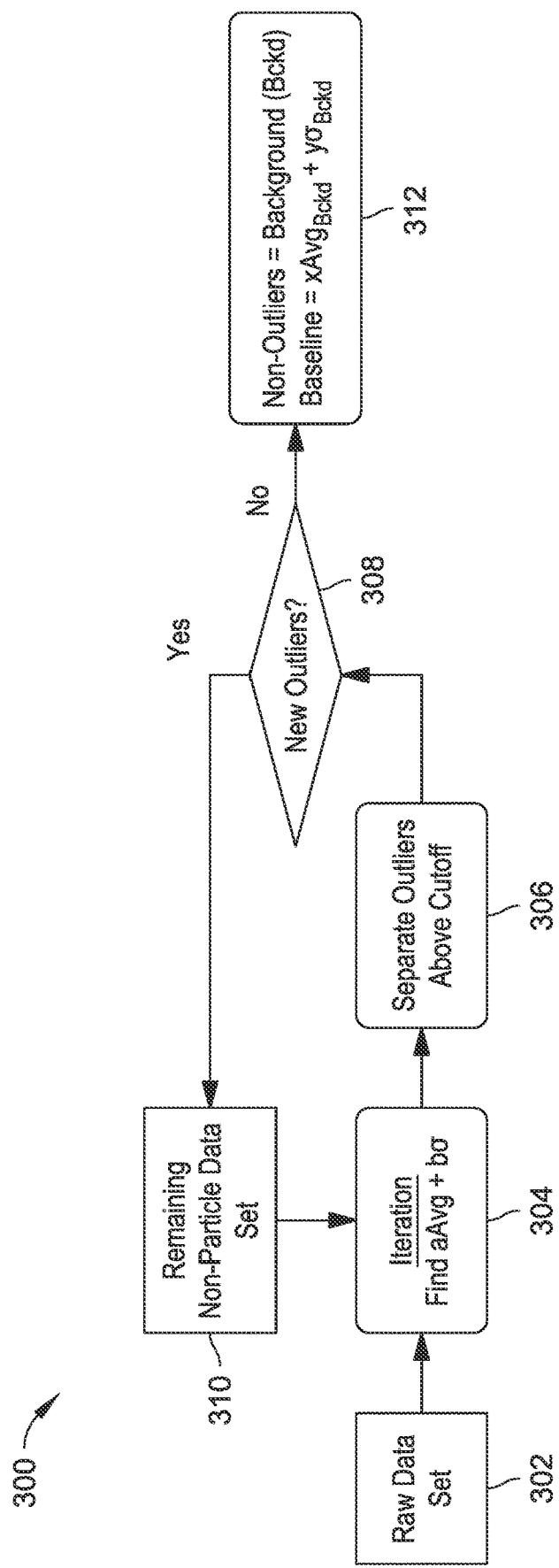
FIG. 3 is a flow diagram of a process for iterative determination of outlier data from a spectrometry data set to determine particle baseline and a detection threshold for nanoparticles in accordance with example implementations of the present disclosure.

Referring to FIG. 3, a flow diagram is shown of a process 300 for iterative determination of outlier data from a spectrometry data set to determine particle baseline and a detection threshold for nanoparticles in accordance with example implementations of the present disclosure. The flow diagram begins with a raw data set provided through spectrometry analysis of a sample (e.g., via ICPMS) in block 302. For example, for a spectrometry data set including ion signal intensity detected by the ion detector 108 as a function of time, the raw data set can include a count distribution of ion signal intensity and a frequency of the ion signal intensity. The raw data set is processed to determine a first iteration of an average and a standard deviation to determine outlier data points (e.g., those above a threshold) in block 304. In the example process shown, the outlier data points are identified as those exceeding a threshold of 1*avg+5*standarddeviation ($1\mu + 5\sigma$). It is noted that the processes described herein are not limited to the multiples provided in the threshold calculation (i.e., 1*avg or 5*standarddeviation), where different multiples for the average and the standard deviation can be utilized. For example, in implementations, the multiples for the average and the standard deviation are a user-selectable feature. For instance, a user can select a specific multiple for the average and the standard deviation via interaction with a user interface communicatively coupled with the system 100. In implementations, such as those for analyzing ultra-low level concentration nanoparticles in semiconductor cleaning chemicals, the multiples are specific to the particular chemical analytes present in the nanoparticles and to the chemical matrix in which the nanoparticles are present, as described further herein with respect to FIGS. 16 through 28.

The process 300 then removes any outliers from the data set based on the previous threshold calculation (i.e., $1 \mu + 5\sigma$) to approach a data set having no outliers (i.e., only ionic data without nanoparticle data) in block 306. The remaining data set (i.e., the raw data set without the outlier data) is then processed to determine a second iteration of an average and a standard deviation of the remaining data set to determine outlier data points (e.g., those above a threshold). For example, the process 300 proceeds to block 308 to determine whether any outliers remain based on a new threshold calculation with the remaining dataset after removal of the outlier datapoints from block 306. If outlier data points remain (i.e., "Yes" at block 308), the process 300 can acknowledge a data set having non-particle data still present in block 310 for further iterative removal of particle data. The process 300 continues to iterate the data set to remove the outlier data until no further outliers are identified. For example, the process 300 can proceed back to block 304 to treat the data from block 310 instead of the raw data set from block 302. When no further outliers are identified (i.e., "No" at block 308), the process establishes the resultant dataset as the data background and determines the nanoparticle baseline based on the data background in block 312. In implementations, the data background is determined using a baseline calculation having one or more different multiples than used for the iterative threshold calculations. For example, while the threshold is shown as $a\mu + b\sigma$, the baseline calculation is shown as $x\mu_{background}+y\sigma_{background}$, as described further herein. In implementations, such as those for analyzing ultra-low level concentration nanoparticles in semiconductor cleaning chemicals, the multiples for the threshold calculation and the baseline calculation are specific to the particular chemical analytes present in the nanoparticles and to the chemical matrix in which the nanoparticles are present, as described further herein with respect to FIGS. 16 through 28. An example of the process 300 is described with respect to FIGS. 4-8

Figure 4:
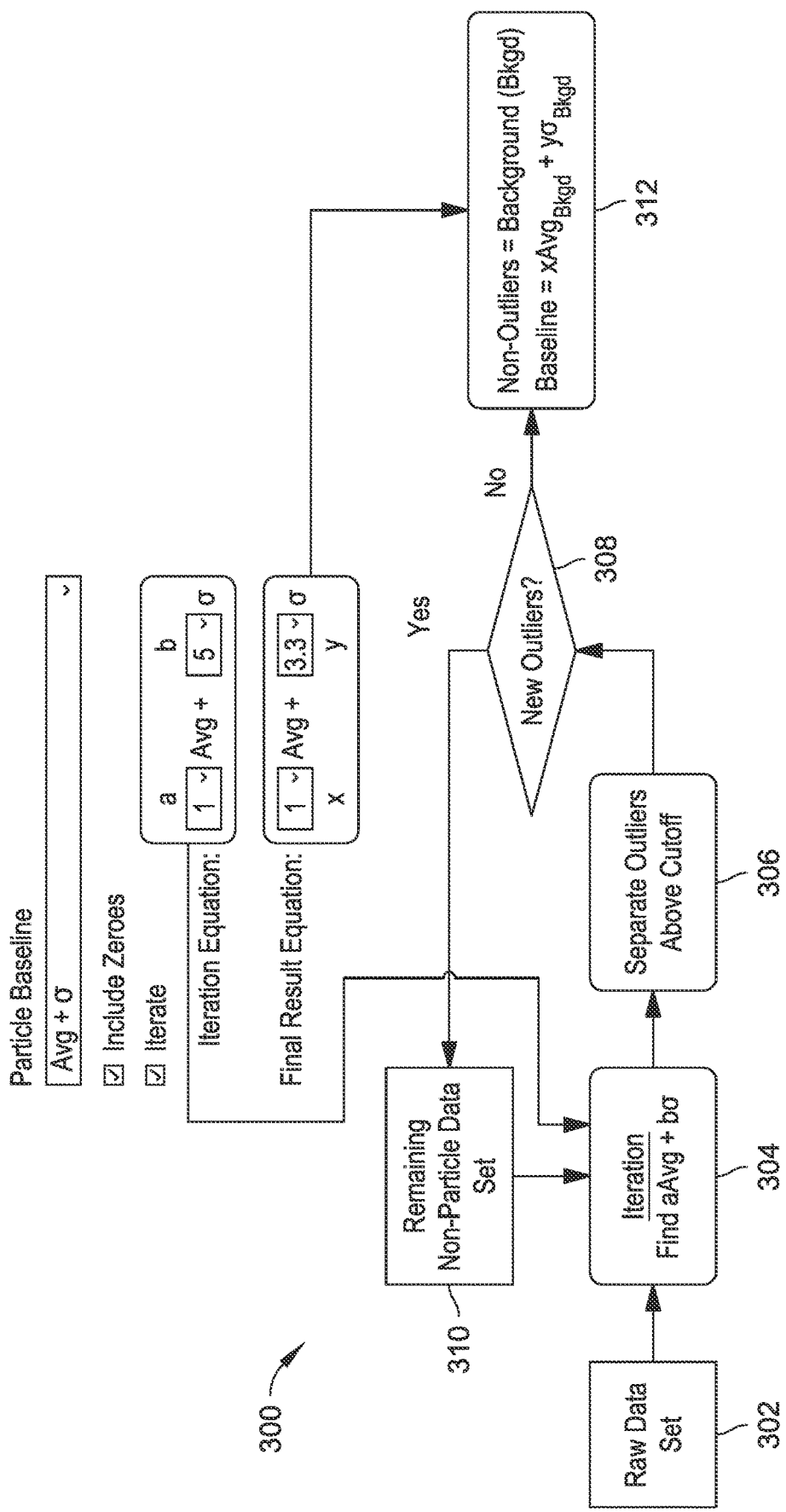
FIG. 4 is a flow diagram of the process of FIG. 3, showing an example iteration step.
Figure 5:
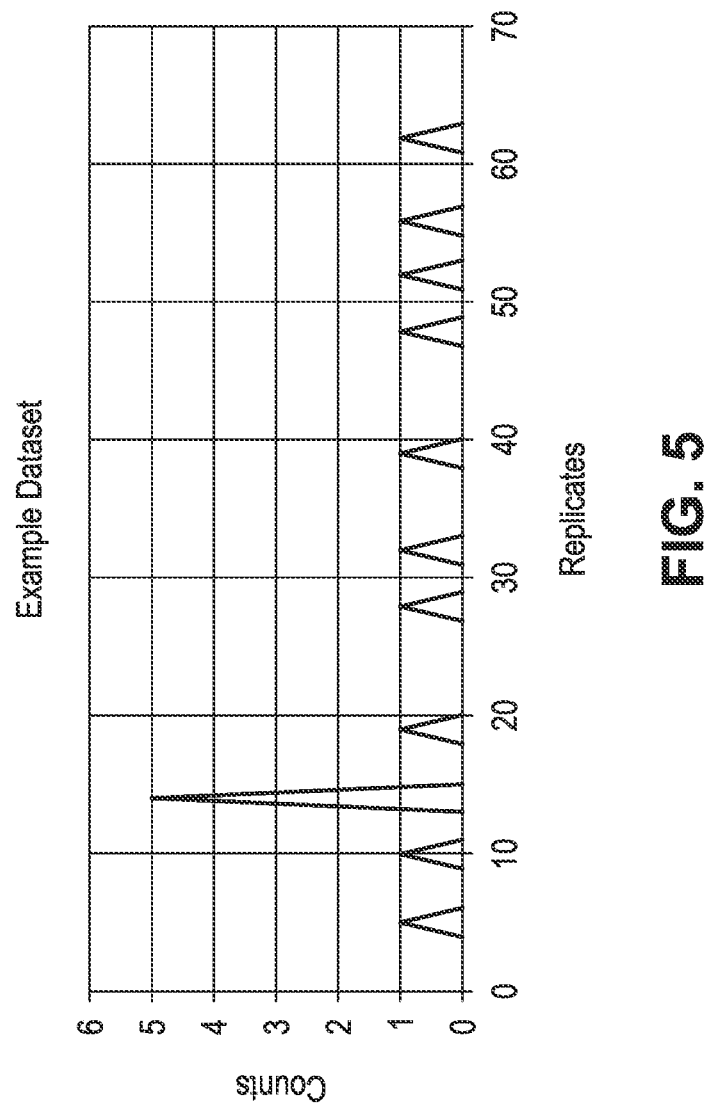
FIG. 5 is a schematic illustration of an example dataset of the iteration step of the process of FIG. 3.
Figure 6:
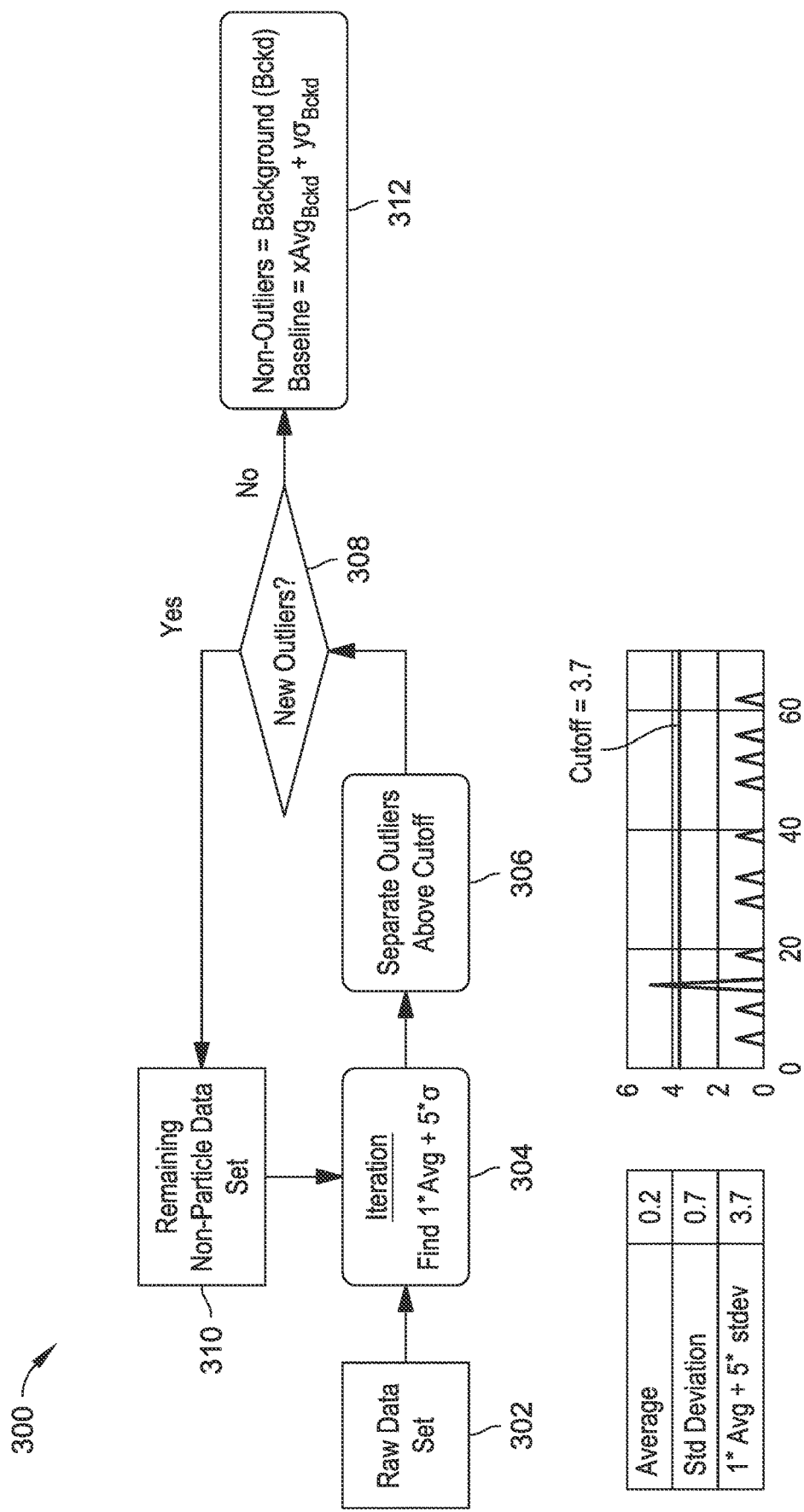
FIG. 6 is a schematic illustration of a first iteration of the process of FIG. 3 to remove a first portion of outlier data.

Referring to FIGS. 4-6, an initial iterative step for treatment of the raw data set is shown, where FIG. 5 shows an example raw dataset from block 302 provided in simplified form for initial outlier removal. As shown in FIG. 6, the outlier threshold is determined to be 3.7 based on a threshold calculation of 1 μ+5σ from block 304. Data exceeding the 3.7 cutoff is identified as outliers and subsequently removed from the dataset for further iterations. For example, the replicates shown exceeding the threshold line of 3.7 (i.e., those extending near 5 shown in FIG. 5) are removed from the dataset in block 306.

Figure 7:
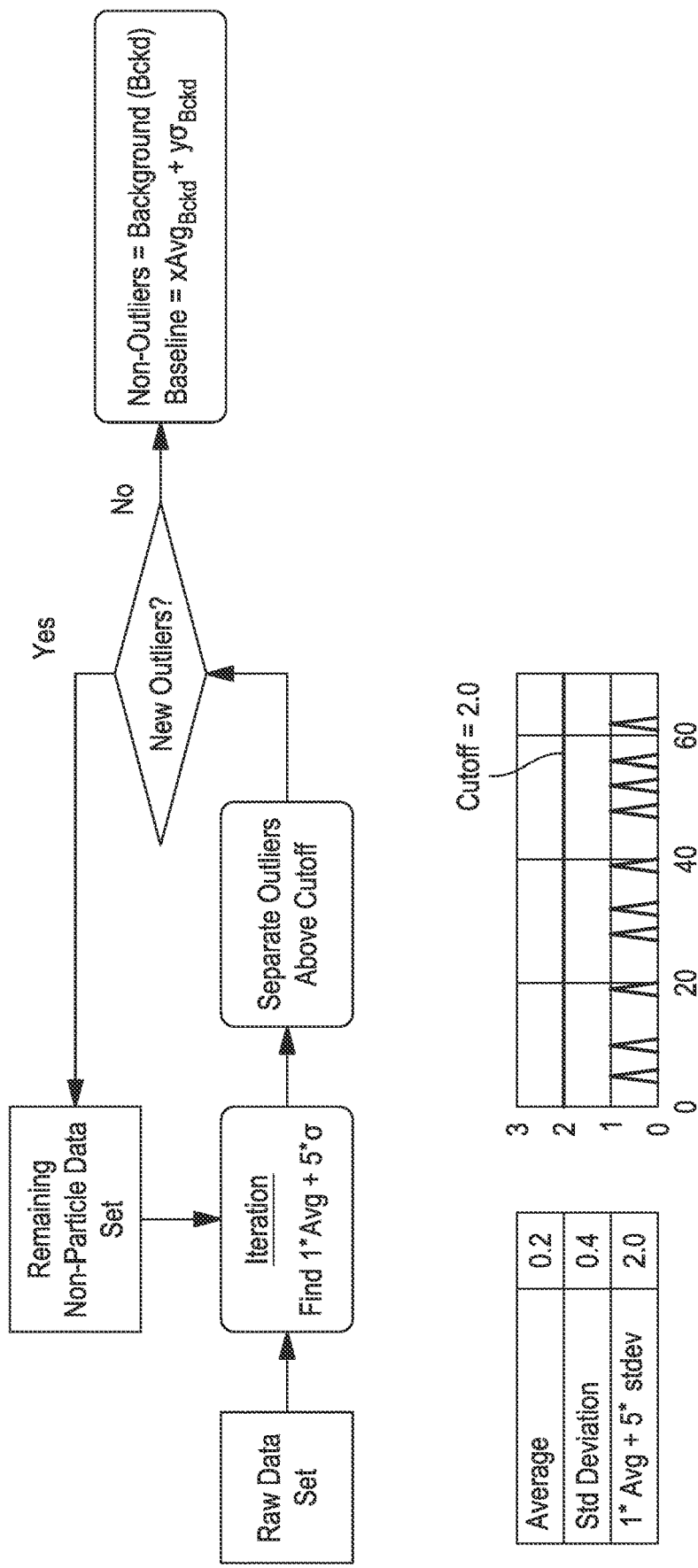
FIG. 7 is a schematic illustration of a second iteration of the process of FIG. 3 to determine whether any outlier data remains.

FIG. 7 shows a second iteration illustrating the dataset with the datapoints that exceeded the threshold line of 3.7 removed. In the second iteration, the new outlier threshold is determined to be 2.0 based on the same threshold calculation of 1 μ+5σ, wherein no datapoints are determined to be outliers, since no datapoints exceed 2.0.

Figure 8:
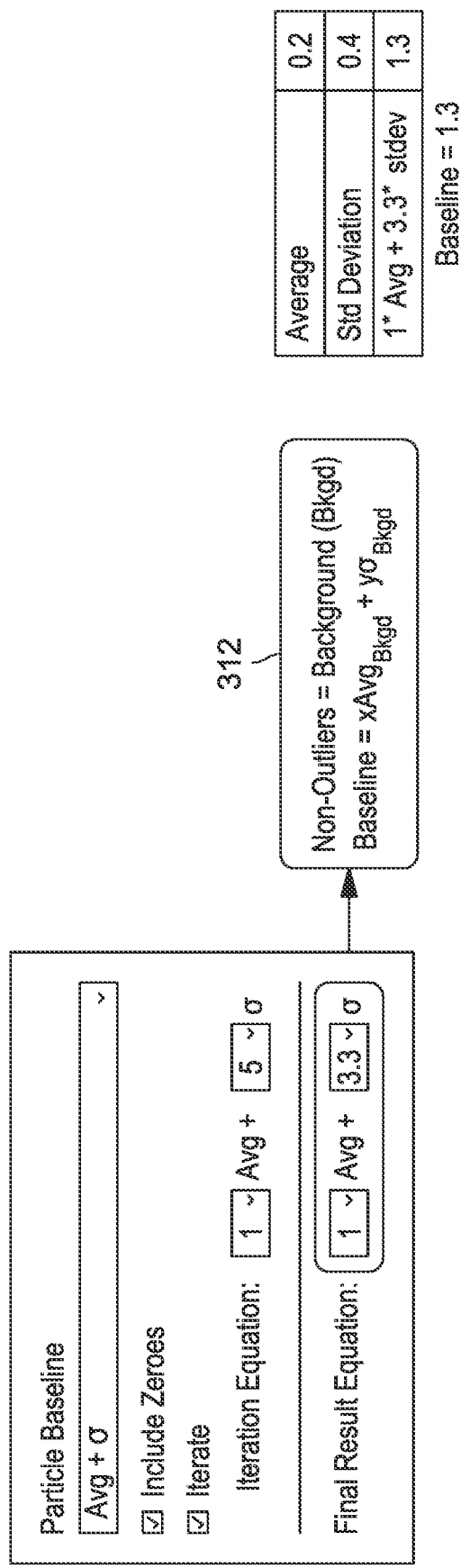
FIG. 8 is a schematic illustration of a particle baseline determination of the process of FIG. 3 following outlier removal.

When no outliers are present (i.e., "No" at block 308), the process 300 determines that data associated with nanoparticle outliers have been removed from the dataset, such that a nanoparticle baseline determination can be made. The process 300 then moves to block 312 to determine the nanoparticle baseline based on the data background. For example, FIG. 8 shows the resultant data providing the data background and determines the nanoparticle baseline based on the data background. While the particle baseline formula shown includes $1*avg_{background}+3.3*standarddeviation_{background}$ the process is not limited to such values, where different multiples for the average and the standard deviation can be utilized. For example, in implementations, the multiples for the average and the standard deviation are a user-selectable feature. In implementations, the multiples for the average and the standard deviation can be different than the multiples for the average and the standard deviation during the iterative removal steps of process 300 (e.g., during block 304). For example, the multiples for the average and the standard deviation for the particle baseline calculation as 1 and 3.3, respectively, whereas the multiples for the average and the standard deviation for the iterative removal calculation as 1 and 5, respectively. Differing multiples for the standard deviation can provide different levels of strictness in determining what data is considered below or above the particle baseline following determination of the background datasets. As described herein, in implementations, such as those for analyzing ultra-low level concentration nanoparticles in semiconductor cleaning chemicals, the multiples for the threshold calculation and the baseline calculation are specific to the particular chemical analytes present in the nanoparticles and to the chemical matrix in which the nanoparticles are present. In implementations, the process 300 can remove zero values for the datasets.

Figure 9A:
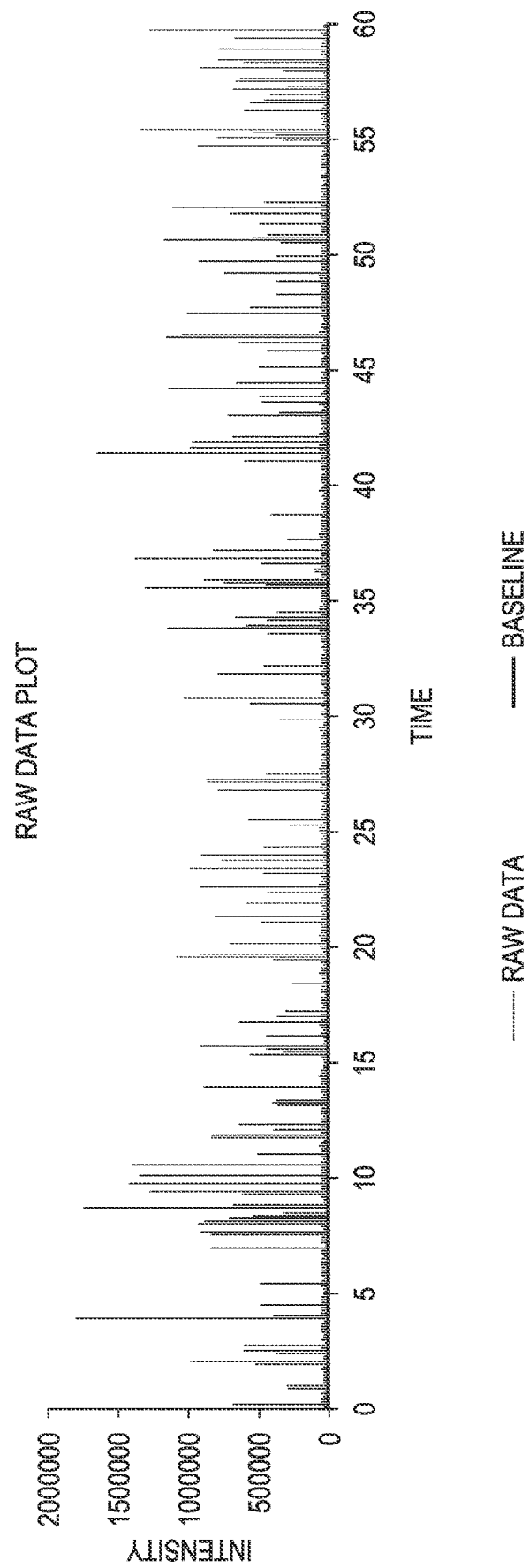
FIG. 9A is a diagram of example datasets analyzed in accordance with example implementations of the present disclosure.
Figure 9B:
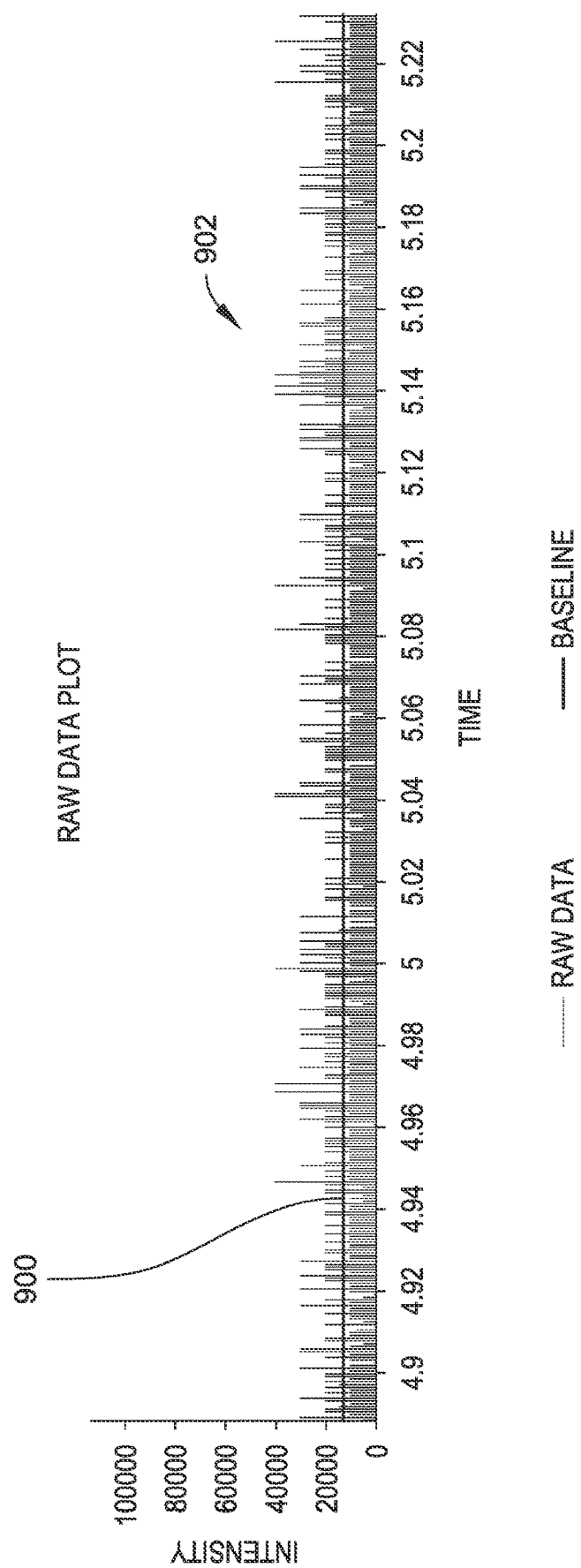
FIG. 9B is a diagram showing a close-up of the data from FIG. 9A with the determined particle baseline shown over the spectrometry data.

Referring to FIGS. 9A and 9B, example datasets are shown with the iterative step including a formula of 1*avg+5*standarddeviation and the particle baseline formula of $1*avg_{background}+1*standarddeviation_{background}$. FIG. 9B illustrates a subset of the data from FIG. 9A with the determined particle baseline 900 shown over the spectrometry data 902.

Figure 10:
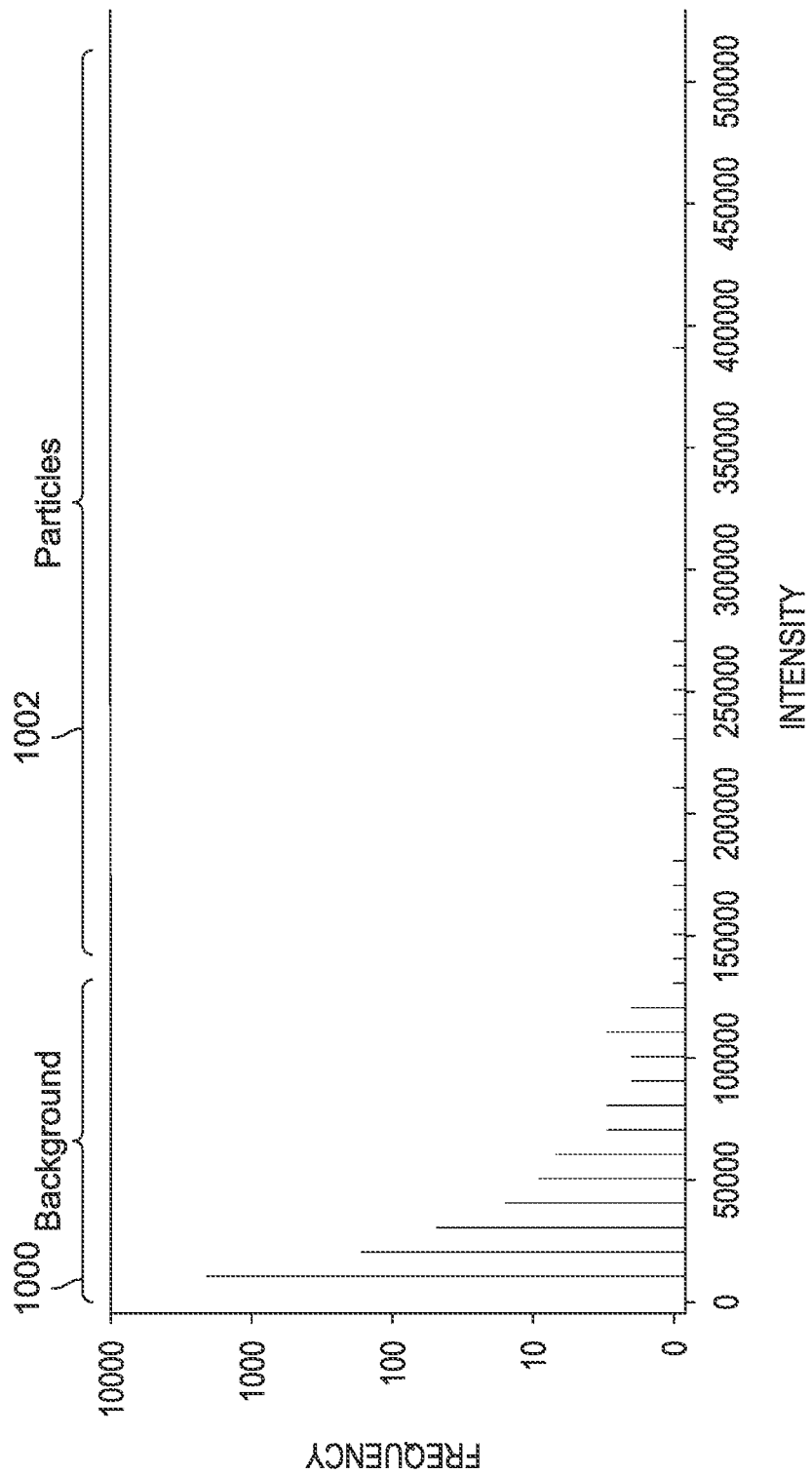
FIG. 10 is a schematic illustration of a spectrometry data set shown with an approximated background determination for determination of nanoparticles in accordance with example implementations of the present disclosure.

Referring to FIGS. 10 through 15, a local minimum data process is described for the determination of a detection threshold of nanoparticles. FIG. 10 shows an example spectrometry data set with an approximated background determination for the detection of nanoparticles where the portion of the data set attributable to signal background (shown as 1000, e.g., attributable to background interference, such as resulting from ionized plasma gases from the ICP torch) is separated from data set attributable to nanoparticles (shown as 1002). The nanoparticle detection threshold represents the transition from the background portion 1000 to the nanoparticle portion 1002, where the nanoparticle detection threshold provides a data boundary where data points involving intensities greater than the nanoparticle detection threshold can be treated as originating from nanoparticles present in the sample.

Figure 11:
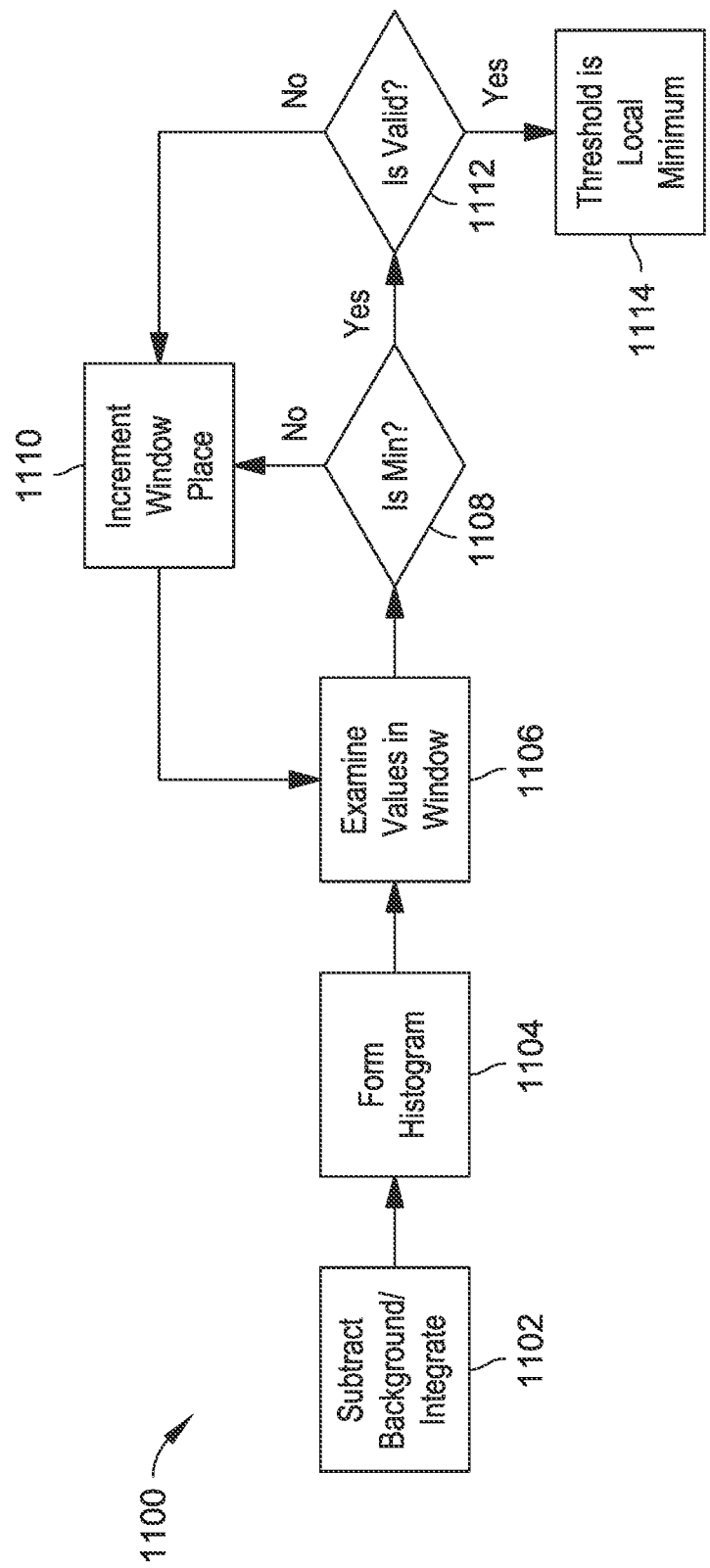
FIG. 11 is a flow diagram of a process for local minimum determination and validation from a spectrometry data set to determine a detection threshold for nanoparticles in accordance with example implementations of the present disclosure.

Referring to FIG. 11, a flow diagram is shown of a process 1100 for local minimum determination and validation of a spectrometry data set to determine a detection threshold for nanoparticles in accordance with example implementations of the present disclosure. The flow diagram begins with a raw data set being manipulated to remove background and to integrate contiguous data points in block 26102. In implementations, the raw data set includes an intensity over time data set provided by an ICPMS, where the background to be removed from the raw data set is determined through a data process, such as the iterative determination data process described with respect to FIGS. 2 through 9B, is a user-selected feature, or combinations thereof. In implementations, the data set is integrated following removal of the background from the raw data set. For example, time-consecutive non-zero data points for detected intensity are summed together, where the data points can be considered to be time-consecutive when no intervening zero value is detected by the ICPMS for a given time detection interval, such as a detection interval of 0.01 secs. By integrating after background removal, more zero data points can be present since the background removal can filter out lower non-zero data points from the raw data set to provide zero values.

The process 1100 then continues to block 26104 where a histogram of the manipulated data set is formed. In implementations, the histogram is formed by rounding all integrated data points to the nearest integer count value and determining the frequency for each rounded point (e.g., a value of 3.2 is rounded to a value of 3, whereas a value of 3.7 is rounded to 4). In implementations, the data is rounded down to the next integer count value (e.g., each of 3.2 and 3.7 is rounded down to a value of 3). In implementations, the data is rounded up to the next integer count value (e.g., each of 3.2 and 3.7 is rounded up to a value of 4). The histogram can be formed from the rounded points based on how many of each point is present (e.g., the frequency of occurrence of each count). Example histograms of simplified data sets are shown with respect to FIGS. 12A through 14.

The process 1100 further includes examining frequencies of the histogram based on a window size for the counts to determine potential local minimum count values in block 26106. In implementations, the window size is an odd number (e.g., a window covering five counts), where the center value for the window is compared against values to the left and to the right of the center position on the histogram to determine whether a local minimum count is present (e.g., whether the frequency of the count at the center of the window is less than the frequencies of the counts to the left and to the right of the center count based on the window size). In implementations, such as those for analyzing ultra-low level concentration nanoparticles in semiconductor cleaning chemicals, the value for the window size for determining local minimum values for nanoparticle detection threshold determination is specific to the particular chemical analytes present in the nanoparticles and to the chemical matrix in which the nanoparticles are present.

Figure 12A:
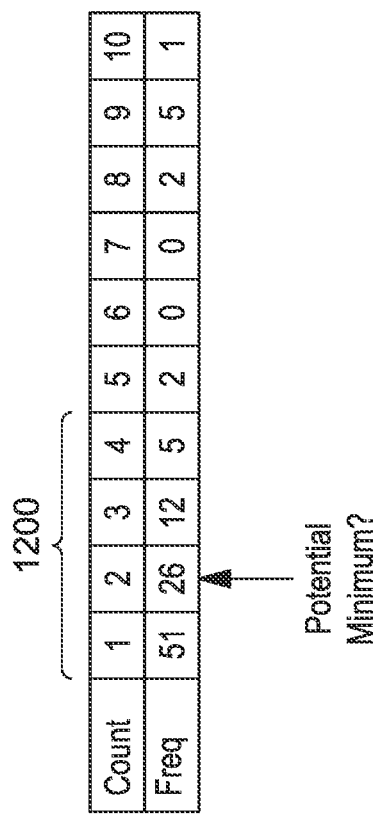
FIG. 12A is a schematic illustration of an example window used to determine potential minimum data points from a histogram of the spectrometry data.

For counts at the beginning edge of the histogram, (e.g., counts 0, 1, 2, etc.), the window may be contracted by not extending over the full window size. For example, FIG. 12A shows a window 1200 covering counts 1 through 4 (i.e., a window size of four), where a frequency of 26, count 2 is reviewed for determining whether the frequency of 26, count 2 is the potential minimum for the given window. The window could be considered as covering count 0 to the left of count 1, such that count 2 is positioned at the center of the window 1200 having a window size of five counts, however no data exists for count 0, so the window covers those counts that are present in the histogram. Similarly, prior to considering count 2, count 1 would be reviewed for a potential local minimum, where if count 1 was the center position of the window 1200, the frequency of 51 would be compared against the frequency of 26, count 2 and the frequency of 12, count 3 to determine whether 51 is the local minimum, where it would be determined that it is not a local minimum.

The process 1100 determines whether the center frequency value of the window is a local minimum in block 26108. If the center frequency value is not a local minimum, the process 1100 proceeds to block 1110 where the window is incremented further to the right of the histogram to review additional count ranges to determine whether the new center frequency value is a local minimum (e.g., via blocks 1106 and 1108). For example, the frequency of 26, count 2 from FIG. 12A is not a local minimum, since the frequency of 12, count 3 and the frequency of 5, count 4 are each less than 26. The window 1200 would then be moved to be centered above count 3 to evaluate whether the frequency of 12 is a local minimum as compared against the frequencies of count 1, count 2, count 4, and count 5. The frequency of 12, count 3 would not be the local minimum, since the frequency of 5, count 4 and the frequency of 2, count 5 are each less than 12. The window 1200 would then be moved to be centered above count 4 to evaluate whether the frequency of 5 is a local minimum as compared against the frequencies of count 2, count 3, count 5, and count 6.

Figure 12B:
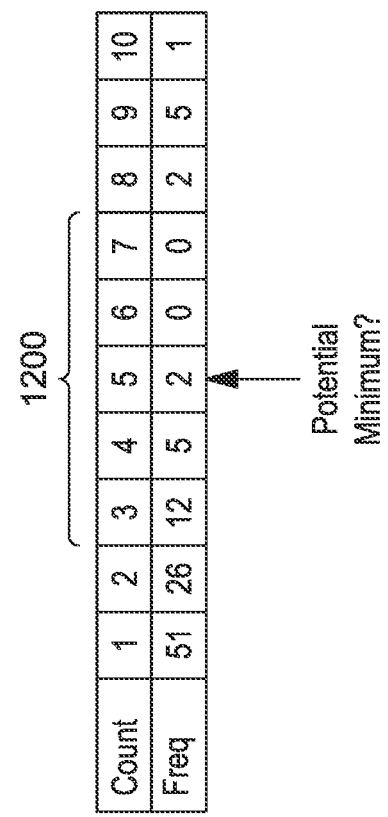
FIG. 12B is a schematic illustration of an example window used to determine potential minimum data points from a histogram of the spectrometry data.

The process 1100 would continue to evaluate each new iteration of the placement of the window 1200. For example, FIGS. 12B and 13 show the window 1200 further down the histogram as compared to FIG. 12A, where the window 1200 covers counts 3 through 7 (i.e., a window value of 5), to determine whether a frequency of 2 would be a potential minimum for the given window. Since the window placement includes 0 frequency values at counts 6 and 7 within the window 1200, the process 1100 would not identify a frequency of 2 as a potential minimum. The process 1100 would continue until a potential local minimum is identified. For example FIG. 13 shows the window incrementing to the right of the histogram until centered above frequency 0, count 6 which is identified as the potential minimum.

When a potential minimum is identified in block 26108, the process 1100 continues to block 1112, where the process 1100 validates whether the potential minimum is a validated minimum. If the potential minimum is not validated, process 1100 continues back to block 1110 to increment the window to be centered above the next count. If the potential minimum is validated in block 1112, the process 1100 would identify the local minimum as a threshold value for nanoparticle detection in block 1114.

For example, referring to FIG. 14, the frequency value of 2 in the histogram is first identified as a potential minimum, since 2 is less than the frequency value of the remainder of the values in the window 1200 (i.e., 2 is less than 22, 18, and 15). The process 1100 then determines whether that potential minimum is validated. In implementations, to determine if a local minimum is valid, the average value of all the frequencies within the window is calculated to determine whether the potential minimum is within one standard deviation from the window average. In implementations, the validation can include determining whether the potential minimum is within a multiple of the standard deviation from the window average. If the potential minimum is more than one standard deviation from the window average (or more than the multiple of the standard deviation in other implementations), then the potential minimum is not validated as a minimum value. For example, referring to FIG. 14, the frequency value of 2, count 2 is not validated, since the frequency value of 2 is not within one standard deviation (shown as 8.65) of the window average (14.25). For instance, 2+8.65 is less than 14.25, so the frequency value of 2, count 2 is not validated.

Figure 15:
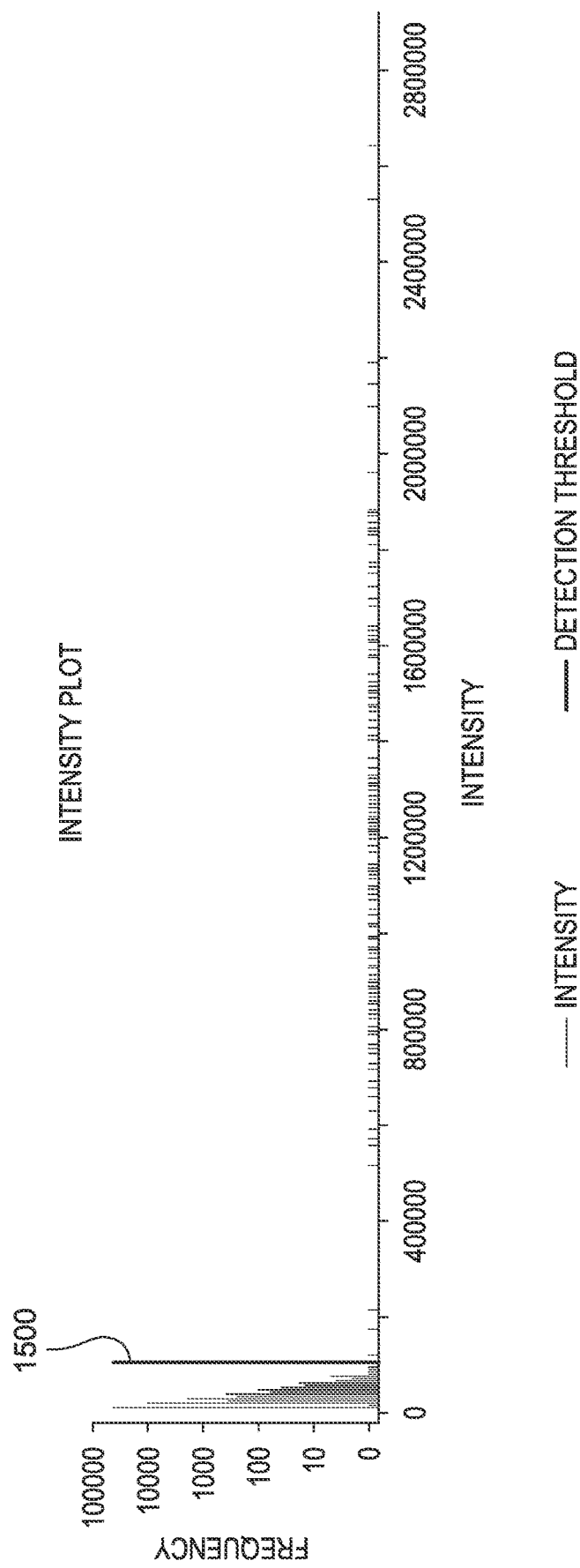
FIG. 15 is a diagram of example datasets analyzed in accordance with example implementations of the present disclosure, with a detection threshold for nanoparticles shown.
Figure 16A:
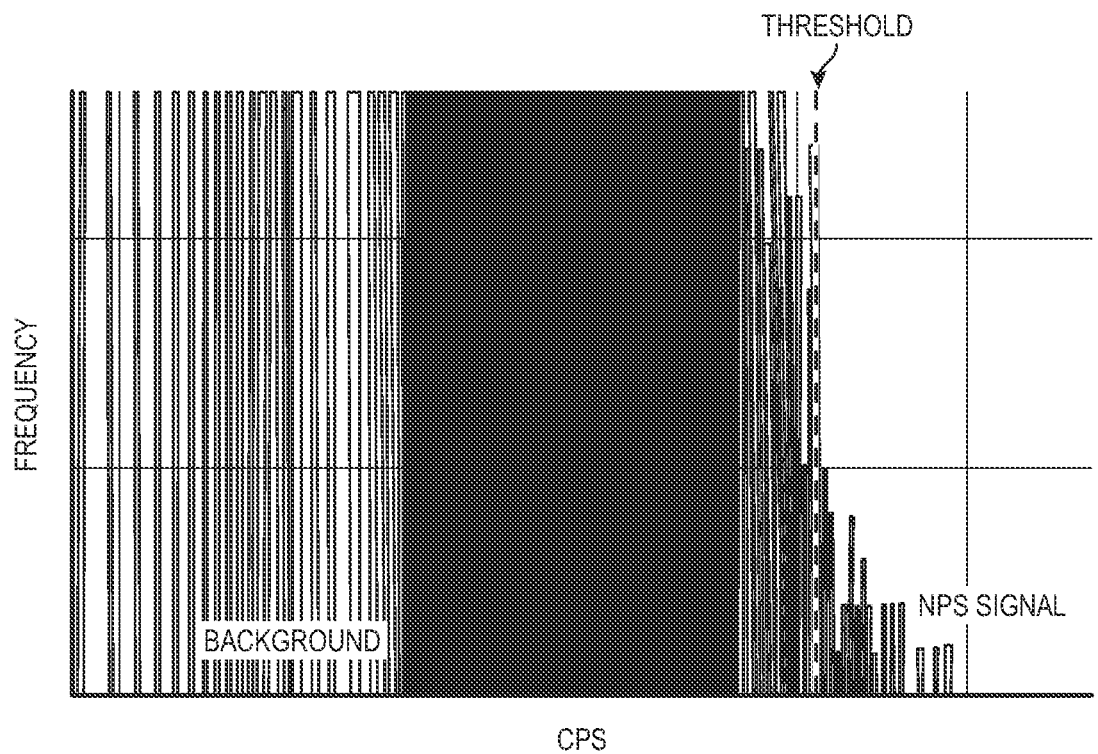
FIG. 16A is a diagram of frequency versus intensity (counts per second, cps) for a spectrometry dataset related to an ultra-low concentration of nanoparticles in a semiconductor cleaning fluid analyzed by a conventional ICPMS instrument-default process.
Figure 16B:
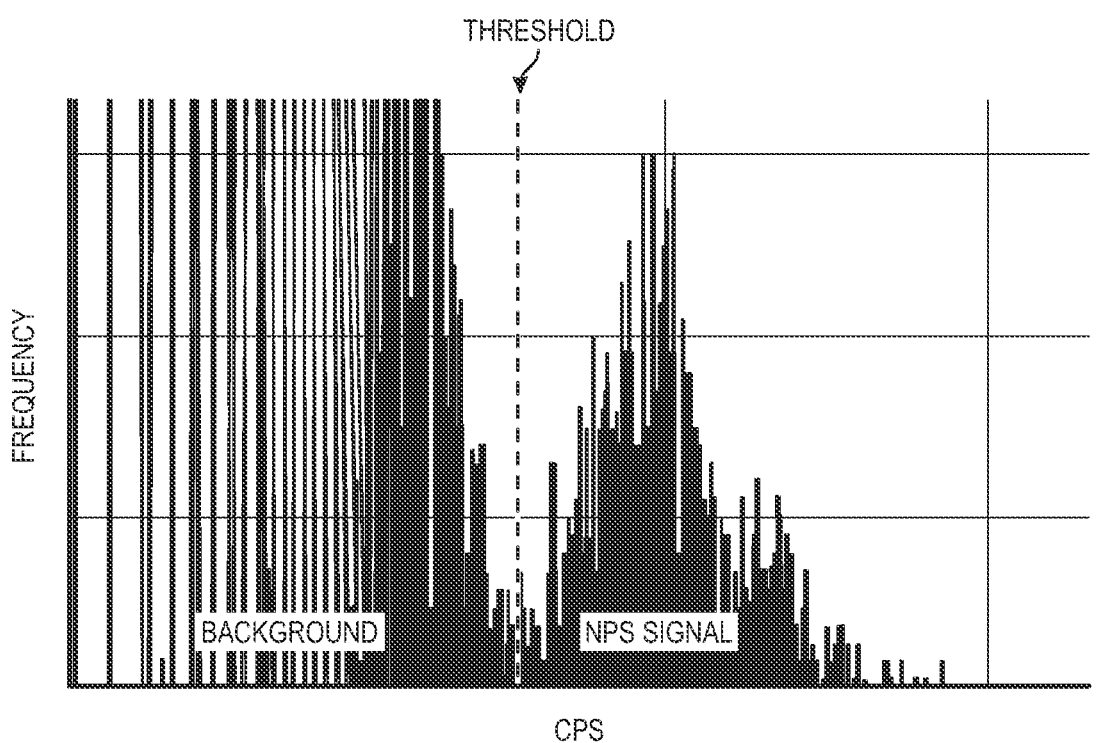
FIG. 16B is a diagram of frequency versus intensity for the spectrometry dataset of FIG. 16A analyzed in accordance with example implementations of the present disclosure.

Continuing with the example shown in FIG. 14, the window place is incremented down the histogram until the window 1200 is centered above count 6, where the frequency of 0 is determined to be a potential minimum. The frequency of 0 is within one standard deviation (6.34) of the window average (3.8), thereby validating count 6, frequency 0 to be the local minimum. The validated localized minimum in then used as the detection threshold for nanoparticles, where intensities greater than the detection threshold are treated as nanoparticles and intensities lower than the detection threshold are treated as background (e.g., ionic samples, mass spectrometry interference, nanoparticles of a size below the detection threshold). FIG. 15 shows an example dataset analyzed according to the local minimum analysis process, with a detection threshold 1500 illustrated to separate background (i.e., intensity values preceding the detection threshold 1500) from intensity values corresponding to nanoparticles present in the sample (i.e., intensity values following the detection threshold 1500).

The processes described herein for determining nanoparticle baseline (e.g., via iterative outlier removal) and nanoparticle detection threshold (e.g., via local minimum window analysis) were determined to be critical in the analysis of ultra-low level concentration nanoparticles in semiconductor cleaning chemicals by single particle inductively coupled plasma mass spectrometry (spICP-MS). For example, a spectrometry dataset for silicon nanoparticles in a semiconductor cleaning chemical at an ultra-low level concentration (e.g., about 300 particles per mL) was analyzed by a conventional ICPMS instrument-default process for the determination of nanoparticles, with the detection threshold results shown in FIG. 16A. The signals attributable to the presence of nanoparticles are not sufficiently distinguished from the overwhelming presence of background ionic interference, where such results cannot reliably provide information about the presence of the nanoparticles in the semiconductor cleaning fluid. In various production or manufacturing processes (e.g., mining, metallurgy, semiconductor fabrication, pharmaceutical processing, etc.), the tolerances for nanoparticle impurities can be very strict, for example, on the order of fractions of parts per billion. For semiconductor wafer processing, the wafer is tested for impurities, such as metallic impurities, that can degrade the capabilities of the wafer or render the wafer inoperable due to diminished carrier lifetimes, dielectric breakdown of wafer components, and the like.

Since even ultra-low level concentrations of nanoparticle contaminants in semiconductor chemicals can negatively influence semiconductor fabrication, the conventional ICPMS instrument-default process was found to be inadequate for preventing manufacturing operation delays or production defects due to the unverifiable presence of nanoparticles at ultra-low level concentrations. The same spectrometry dataset used for the results shown in FIG. 16A was analyzed according to the processes described herein, with the detection threshold results shown in FIG. 16B. The signals attributable to the presence of nanoparticles are clearly distinguished from the presence of background ionic interference, even with the silicon nanoparticles present at an ultra-low level concentration in the semiconductor cleaning chemical.

Additional studies showcased the unreliability of the conventional ICPMS instrument-default process in determining the presence of ultra-low level concentrations of nanoparticle contaminants in semiconductor chemicals. For example, two spectrometry datasets for 20-minute analysis for silicon nanoparticles in sulfuric acid ($H_2SO_4$) at an ultra-low level concentration (e.g., about 310 particles per mL) were analyzed by a conventional ICPMS instrument-default process for the determination of nanoparticles and by the processes described herein. The conventional process indicated a number of particles of silicon in the first data set of zero (i.e., undetected) and a number of particles of silicon in the second data set of 1,001. The variance between an undetected amount of nanoparticles and 1,001 nanoparticles in the same concentration samples rendered the results unreliable and inadequate for commercial production use. The processes described herein indicated a number of particles of silicon in the first data set of 155 and a number of particles of silicon in the second data set of 106.

Figure 17A:
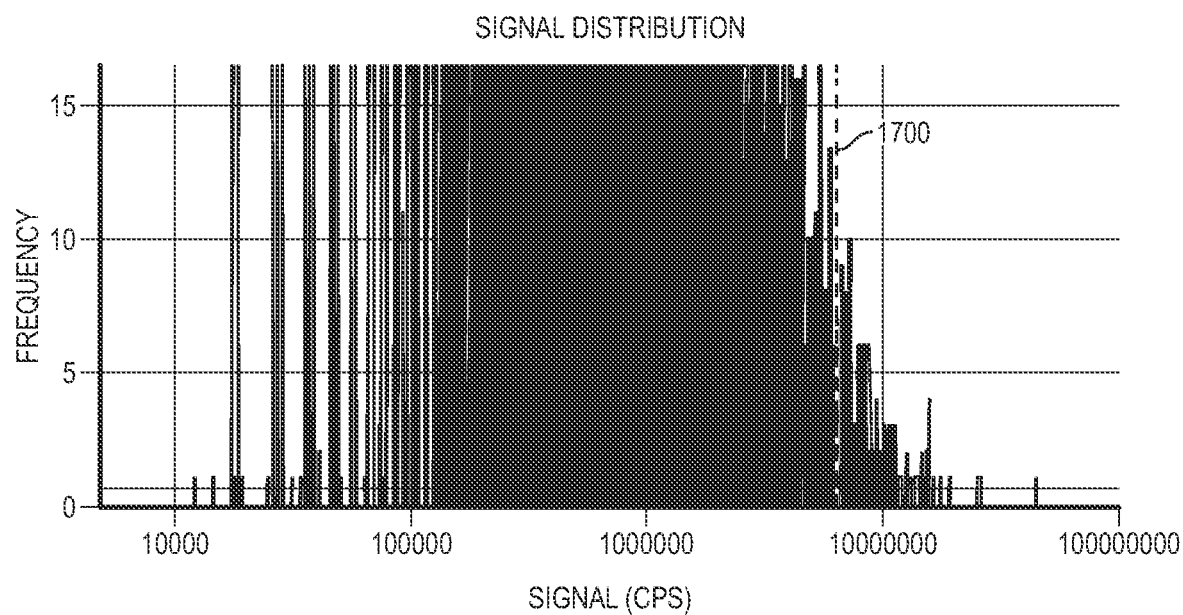
FIG. 17A is a diagram of frequency versus intensity (counts per second, cps) for a spectrometry dataset related to a low concentration of nanoparticles in a semiconductor cleaning fluid analyzed by a conventional ICPMS instrument-default process.
Figure 18A:
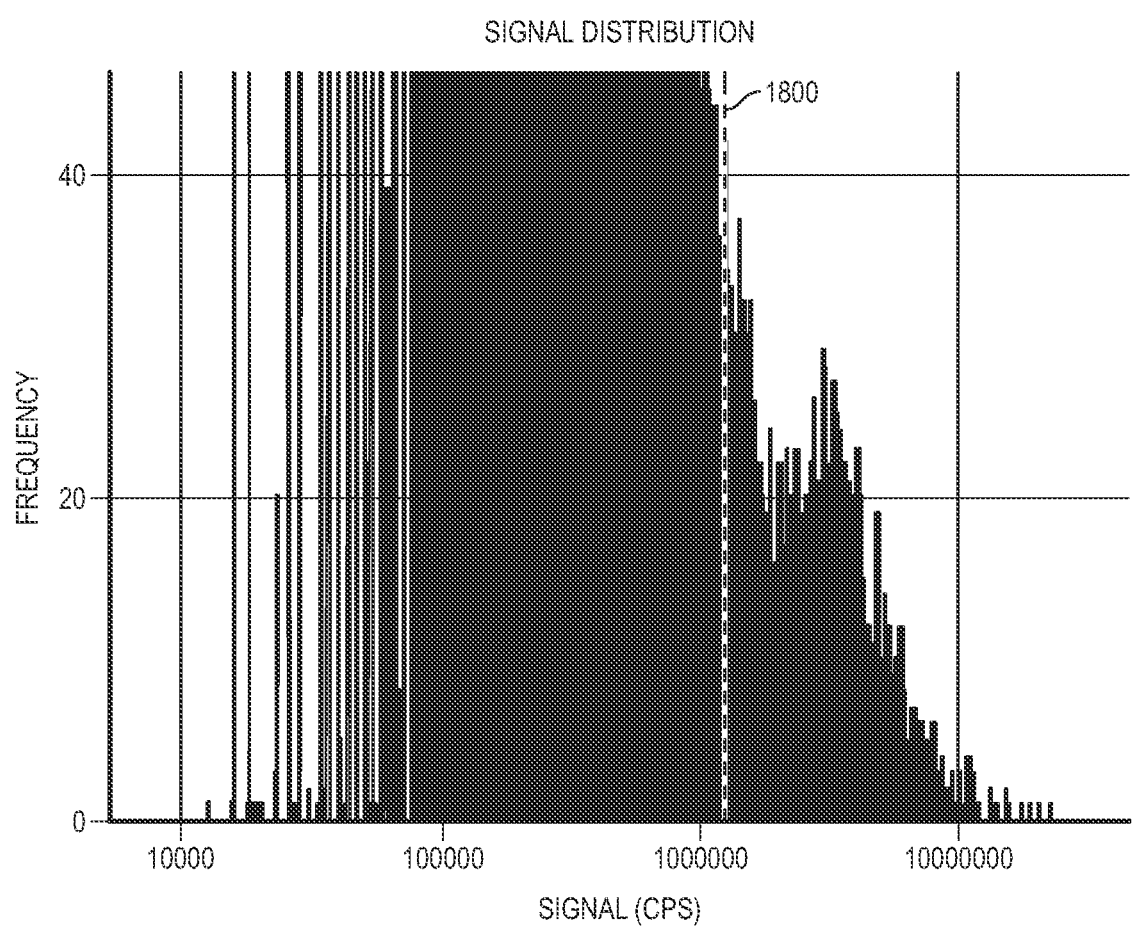
FIG. 18A is a diagram of frequency versus intensity (counts per second, cps) for a spectrometry dataset related to a low concentration of nanoparticles in a semiconductor cleaning fluid analyzed by a conventional ICPMS instrument-default process.

Referring to FIGS. 17A and 18A, additional examples of the unreliability of the conventional ICPMS instrument-default process in determining the presence of low level concentrations of nanoparticle contaminants in semiconductor chemicals are shown. For instance, the detection thresholds 1700 and 1800 shown in FIGS. 17A and 18A, respectively, failed to isolate the signals associated with the nanoparticles and instead blended into the background ionic signals. The sample that was analyzed to provide the frequency vs. intensity chart in FIG. 17A was a fluid sample of silicon nanoparticles (100 nm) present at a concentration of 200 ppt (approximately 14,400 particles per mL) in hydrogen peroxide ($H_2O_2$). The conventional ICPMS instrument-default process determined a particle baseline of approximately 192,000 cps and a detection threshold of 590,000 cps. The sample that was analyzed to provide the frequency vs. intensity chart in FIG. 18A was a fluid sample that contained both dissolved ionic silicon and silicon nanoparticles, namely 500 ppt ionic silicon and silicon nanoparticles (100 nm) present at a concentration of 200 ppt (approximately 14,400 particles per mL) in ammonium hydroxide ($NH_4OH$). The conventional ICPMS instrument-default process determined a particle baseline of approximately 204,000 cps and a detection threshold of 2,100,000 cps.

Figure 17B:
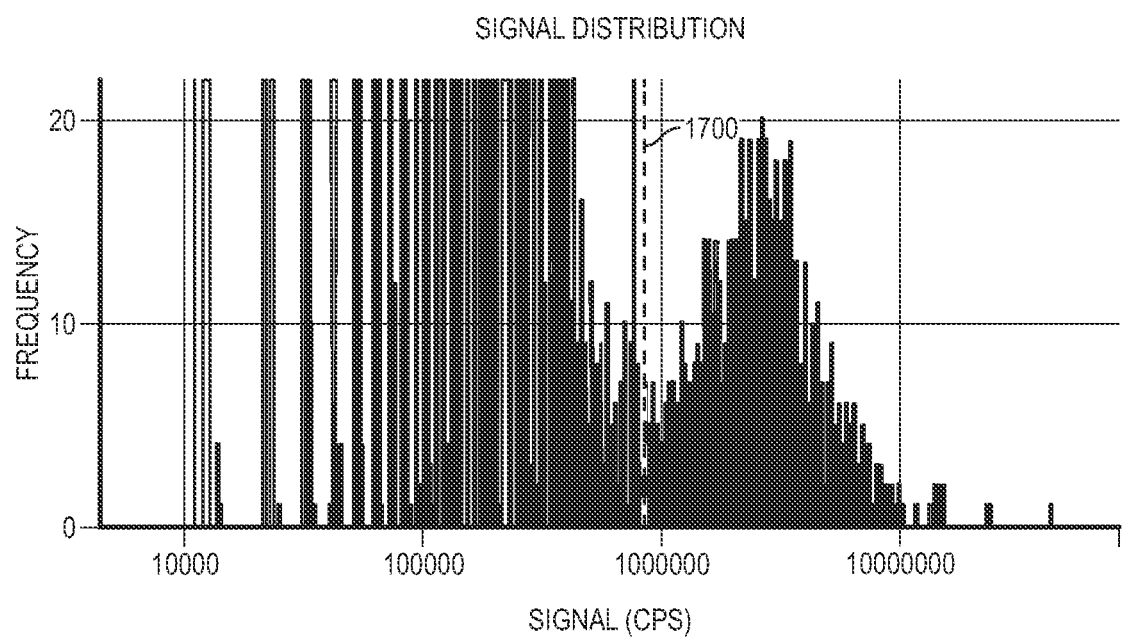
FIG. 17B is a diagram of frequency versus intensity for the spectrometry dataset of FIG. 17A analyzed in accordance with example implementations of the present disclosure.
Figure 18B:
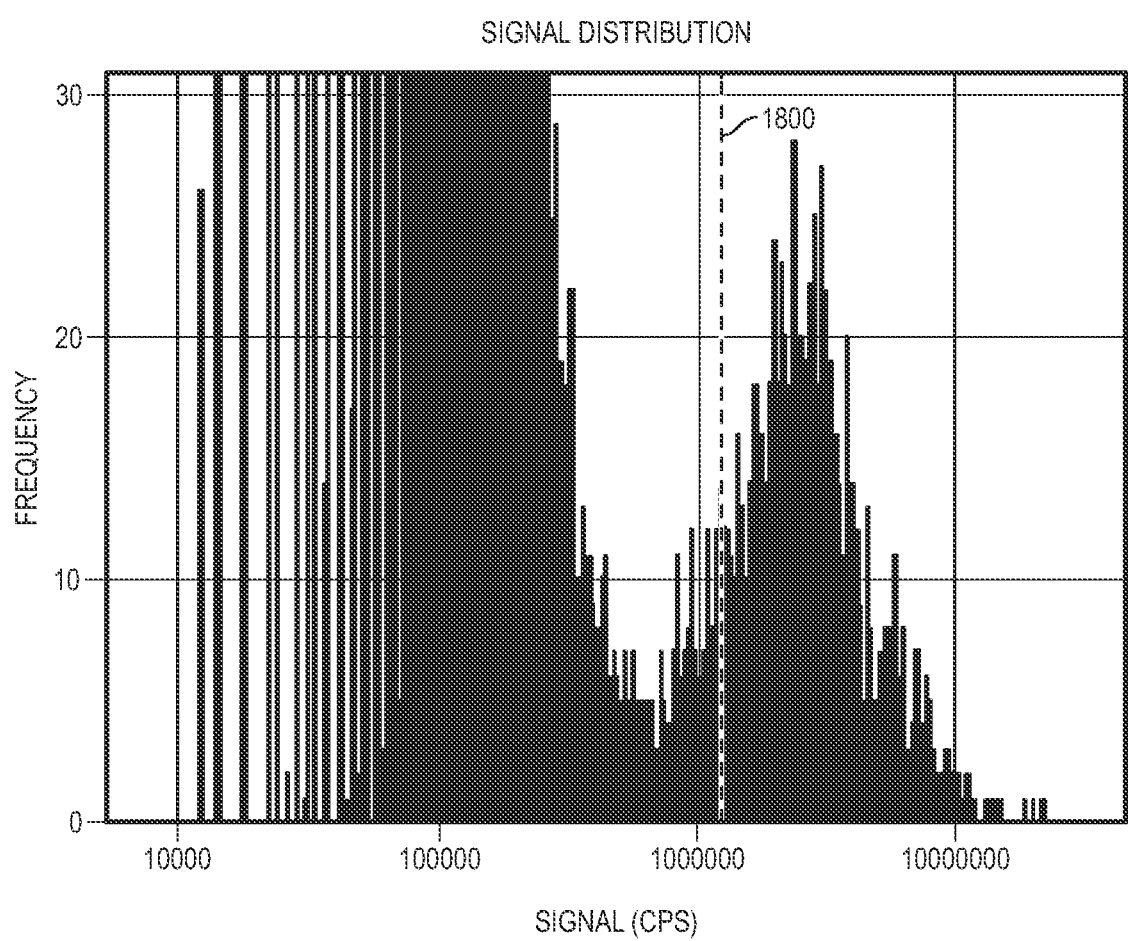
FIG. 18B is a diagram of frequency versus intensity for the spectrometry dataset of FIG. 18A analyzed in accordance with example implementations of the present disclosure.

Referring to FIGS. 17B and 18B, results are shown of the processes described herein applied to the same data sets used for FIGS. 17A and 18A, respectively. The detection thresholds 1700 and 1800 are shown to isolate the signals associated with the nanoparticles from the signals associated with the ionic content, including the dissolved silicon. The processes described herein included, for the datasets associated with each of FIGS. 17B and 18B, a multiple of the iteration sigma of 5, a multiple of the final baseline sigma of 1, and a window size for the local minimum analysis of 7, which determined a particle baseline of approximately 271,000 cps and a detection threshold of 760,000 cps for the sample associated with FIG. 17B and a particle baseline of approximately 278,000 cps and a detection threshold of 1,260,000 cps for the sample associated with FIG. 18B.

Referring to FIG. 19, an additional example is shown of the unreliability of the conventional ICPMS instrument-default process in determining the presence of ultra-low level concentrations of nanoparticle contaminants in semiconductor chemicals having both dissolved ionic silicon and silicon nanoparticles. Standard solutions were prepared including 100 nm Si nanoparticles present at a concentration of 200 ppt in sulfuric acid ($H_2SO_4$). The standard solutions included varying amounts of ionic silicon ranging from no ionic silicon (i.e., zero ppt) to 5000 ppt of ionic silicon with the amount of nanoparticles held constant at 200 ppt. An ICPMS instrument analyzed the standard solutions, with the output data independently analyzed by the conventional ICPMS instrument-default process and by the processes described herein, with the processes described herein utilizing a multiple of the iteration sigma of 5, a multiple of the final baseline sigma of 1, and a window size for the local minimum analysis of 7. As seen in the table in FIG. 19, the instrument default process provided results of the number of particles having a relative standard deviation (RSD) of 46% as compared to an RSD of 8% for results of the number of particles analyzed by the processes described herein. Further discrepancies were seen in the mean particle size determinations of the respective processes, where the instrument default process provided an RSD of 17% as compared to an RSD of 2% for results of the mean particle size analyzed by the processes described herein. The analysis produced frequency versus signal charts similar to those provided in FIGS. 17A and 17B, with the default instrument process providing a detection threshold that failed to isolate the signals associated with the nanoparticles from the ionic content (including the dissolved Si) and with the processes described herein providing a detection threshold that isolated the signals associated with the nanoparticles from the ionic content.

The processes described herein for determining nanoparticle baseline and nanoparticle detection threshold include multiples or variables for various portions of the iterative outlier removal and local minimum window analyses that are dependent on each of the chemical matrix in which the sample nanoparticles are present and the type of analyte of the sample nanoparticles. The multiples or variables were determined to be critical in the analysis of ultra-low level concentration nanoparticles in semiconductor cleaning chemicals by single particle inductively coupled plasma mass spectrometry (spICP-MS) with distinct variance between differing chemical matrices and sample analyte types. For example, the multiples or variables can include, but are not limited to, the multiple of the iteration sigma (e.g., a multiple of a standard deviation of a pulse count distribution), a multiple of the final baseline sigma (e.g., a multiple of a standard deviation of a resultant pulse count distribution with no outlier data points remaining), and a window size for the local minimum analysis (e.g., a window width used to determine local minimum values in a histogram of the baseline data set (i.e., integrated data set after particle baseline intensity values have been subtracted)). Example determinations of the multiple of the iteration sigma, the multiple of the final baseline sigma, and the window size for the local minimum analysis are provided below to illustrate variations between distinct chemical matrix types and distinct sample analyte types.

Referring to FIG. 20, results of the processes described herein are shown to depend on the multiple of the iteration sigma for the iterative outlier removal portion of the process. The data shown is based on detection of silicon nanoparticles in an ammonium matrix. Three multiples of the iteration sigma for the iterative outlier removal portion of the process were utilized (3.3, 5, and 7), each with constant values for the multiple of the final baseline sigma (1) and the window size for the local minimum analysis (7). The process utilizing the 5, 1, 7 values (i.e., 5 for the multiple of the iteration sigma, 1 the multiple of the final baseline sigma, and 7 for the window width) had a significantly lower value of RSD (7.66%) for the number of silicon nanoparticles as compared to the other processes (9.35% and 9.06%), which indicated that the value of the multiple of the iteration sigma for the iterative outlier removal portion of the process was significant for the determination of nanoparticles of silicon in an ammonium matrix. However, the value of 5 for the multiple of the iteration sigma was not shown to be appropriate for certain other analytes of interest in ammonium matrices or for silicon in different chemical matrices, as described further herein with respect to FIGS. 23 and 24.

Referring to FIG. 21, results of the processes described herein are shown to depend on the multiple of the final baseline sigma for the iterative outlier removal portion of the process. The data shown is based on detection of silicon nanoparticles in an ammonium matrix. Three multiples of the final baseline sigma for the iterative outlier removal portion of the process were utilized (1, 2, and 3), each with constant values for the multiple of the iterative sigma (5) and the window size for the local minimum analysis (7). The process utilizing the 5, 1, 7 values (i.e., 5 for the multiple of the iteration sigma, 1 the multiple of the final baseline sigma, and 7 for the window width) had a significantly lower value of RSD (27.54%) for the number of silicon nanoparticles as compared to the other processes (39.14% and 29.07%), which indicated that the value of the multiple of the final baseline sigma for the iterative outlier removal portion of the process was significant for the determination of nanoparticles of silicon in an ammonium matrix. However, the value of 1 for the multiple of the final baseline sigma was not shown to be appropriate for silicon in all chemical matrices, as described further herein with respect to FIG. 25.

Referring to FIG. 22, results of the processes described herein are shown to depend on the window width for the local minimum window analysis portion of the process. The data shown is based on detection of silicon nanoparticles in an ammonium matrix. Three window widths for the local minimum window analysis portion of the process were utilized (7, 9, and 11), each with constant values for the multiple of the iterative sigma (5) and the multiple of the final baseline sigma (1). The process utilizing the 5, 1, 7 values (i.e., 5 for the multiple of the iteration sigma, 1 the multiple of the final baseline sigma, and 7 for the window width) had a significantly lower value of RSD (7.66%) for the number of silicon nanoparticles as compared to the other processes (8.87% and 9.11%), which indicated that the value of the window width for the local minimum window analysis portion of the process was significant for the determination of nanoparticles of silicon in an ammonium matrix. However, the value of 7 for the window width was not shown to be appropriate for certain other analytes of interest in ammonium matrices or for silicon in different chemical matrices, as described further herein with respect to FIGS. 23 and 24.

Referring to FIG. 23, it is shown that the values for the multiple of the iterative sigma, the multiple of the final baseline sigma, and the widow width are chemical matrix-specific for a given analyte of interest. For instance, the values for the multiple of the iterative sigma (5), the multiple of the final baseline sigma (1), and the widow width (7) appropriate for silicon in an ammonium matrix may not be appropriate for silicon in a different chemical matrix, such as hydrogen peroxide ($H_2O_2$) or isopropyl alcohol (IPA). As previously described, the process utilizing the 5, 1, 7 values (i.e., 5 for the multiple of the iteration sigma, 1 the multiple of the final baseline sigma, and 7 for the window width) resulted in an RSD of 7.66% for the number of silicon nanoparticles in an ammonium matrix. For different chemical matrices, the RSD values were significantly different when utilizing the same 5, 1, 7 values. For instance, the process utilizing the 5, 1, 7 values for silicon nanoparticles in hydrogen peroxide resulted in an RSD of 142.89%, whereas the process utilizing the 5, 1, 7 values for silicon nanoparticles in isopropyl alcohol resulted in an RSD of 83.66%, which indicated that that values for the process for silicon were specific to the determination of the presence of silicon nanoparticles in an ammonium matrix. As a comparison to different process conditions, by changing the values from 5, 1, 7 to 5, 1, 11 for silicon in hydrogen peroxide, the process resulted in an RSD of 7.34% (compared to 142.89% for the 5, 1, 7 values). Similarly, by changing the values from 5, 1, 7 to 1, 3, 5 for silicon in isopropyl alcohol, the process resulted in an RSD of 7.48% (compared to 83.66% for the 5, 1, 7 values).

Referring to FIG. 24, it is shown that the values for the multiple of the iterative sigma, the multiple of the final baseline sigma, and the widow width are analyte of interest-specific for a given chemical matrix. For instance, the values for the multiple of the iterative sigma (5), the multiple of the final baseline sigma (1), and the widow width (7) appropriate for silicon in an ammonium matrix may not be appropriate for a different analyte (e.g., iron (Fe), gold (Au), or the like) in the ammonium matrix. As previously described, the process utilizing the 5, 1, 7 values (i.e., 5 for the multiple of the iteration sigma, 1 the multiple of the final baseline sigma, and 7 for the window width) resulted in an RSD of 7.66% for the number of silicon nanoparticles in an ammonium matrix. For a different analyte of interest in an ammonium matrix, the RSD values were significantly different when utilizing the same 5, 1, 7 values. For instance, the process utilizing the 5, 1, 7 values for iron nanoparticles in ammonium resulted in an RSD of 23.28%, whereas the process utilizing the 5, 1, 7 values for gold nanoparticles in ammonium resulted in an RSD of 109.01%, which indicated that that values for the process for ammonium matrixes were specific to the determination of the presence of silicon nanoparticles in an ammonium matrix. As a comparison to different process conditions, by changing the values from 5, 1, 7 to 7, 1, 3 for iron in ammonium, the process resulted in an RSD of 13.70% (compared to 23.28% for the 5, 1, 7 values). Similarly, by changing the values from 5, 1, 7 to 7, 1, 7 for gold in ammonium, the process resulted in an RSD of 13.54% (compared to 109.01% for the 5, 1, 7 values).

Referring to FIG. 25, results of the processes described herein are shown to depend on the multiple of the iteration sigma and the multiple of the final baseline sigma for the iterative outlier removal portion of the process and on the window width for the local minimum window analysis portion of the process. The data shown is based on detection of silicon nanoparticles in an isopropyl alcohol matrix. Three multiples of the iteration sigma for the iterative outlier removal portion of the process were utilized (1, 2, and 3), each with constant values for the multiple of the final baseline sigma (3) and the window size for the local minimum analysis (5). The process utilizing the 1, 3, 5 values (i.e., 1 for the multiple of the iteration sigma, 3 the multiple of the final baseline sigma, and 5 for the window width) had a significantly lower value of RSD (4.66%) for the number of silicon nanoparticles as compared to the other processes (45.82% and 39.28%), which indicated that the value of the multiple of the iteration sigma for the iterative outlier removal portion of the process was significant for the determination of nanoparticles of silicon in an isopropyl alcohol matrix. Three multiples of the final baseline sigma for the iterative outlier removal portion of the process were utilized (1, 2, and 3), each with constant values for the multiple of the iterative sigma (1) and the window size for the local minimum analysis (5). The process utilizing the 1, 3, 5 values (i.e., 1 for the multiple of the iteration sigma, 3 the multiple of the final baseline sigma, and 5 for the window width) had a significantly lower value of RSD (4.66%) for the number of silicon nanoparticles as compared to the other processes (9.26% and 23.27%), which indicated that the value of the multiple of the final baseline sigma for the iterative outlier removal portion of the process was significant for the determination of nanoparticles of silicon in an isopropyl alcohol matrix. Three window widths for the local minimum window analysis portion of the process were utilized (5, 7, and 9), each with constant values for the multiple of the iterative sigma (1) and the multiple of the final baseline sigma (3). The process utilizing the 1, 3, 5 values (i.e., 1 for the multiple of the iteration sigma, 3 the multiple of the final baseline sigma, and 5 for the window width) had a significantly lower value of RSD (4.66%) for the number of silicon nanoparticles as compared to the other processes (55.31% and 61.54%), which indicated that the value of the window width for the local minimum window analysis portion of the process was significant for the determination of nanoparticles of silicon in an isopropyl alcohol matrix.

Figure 26:
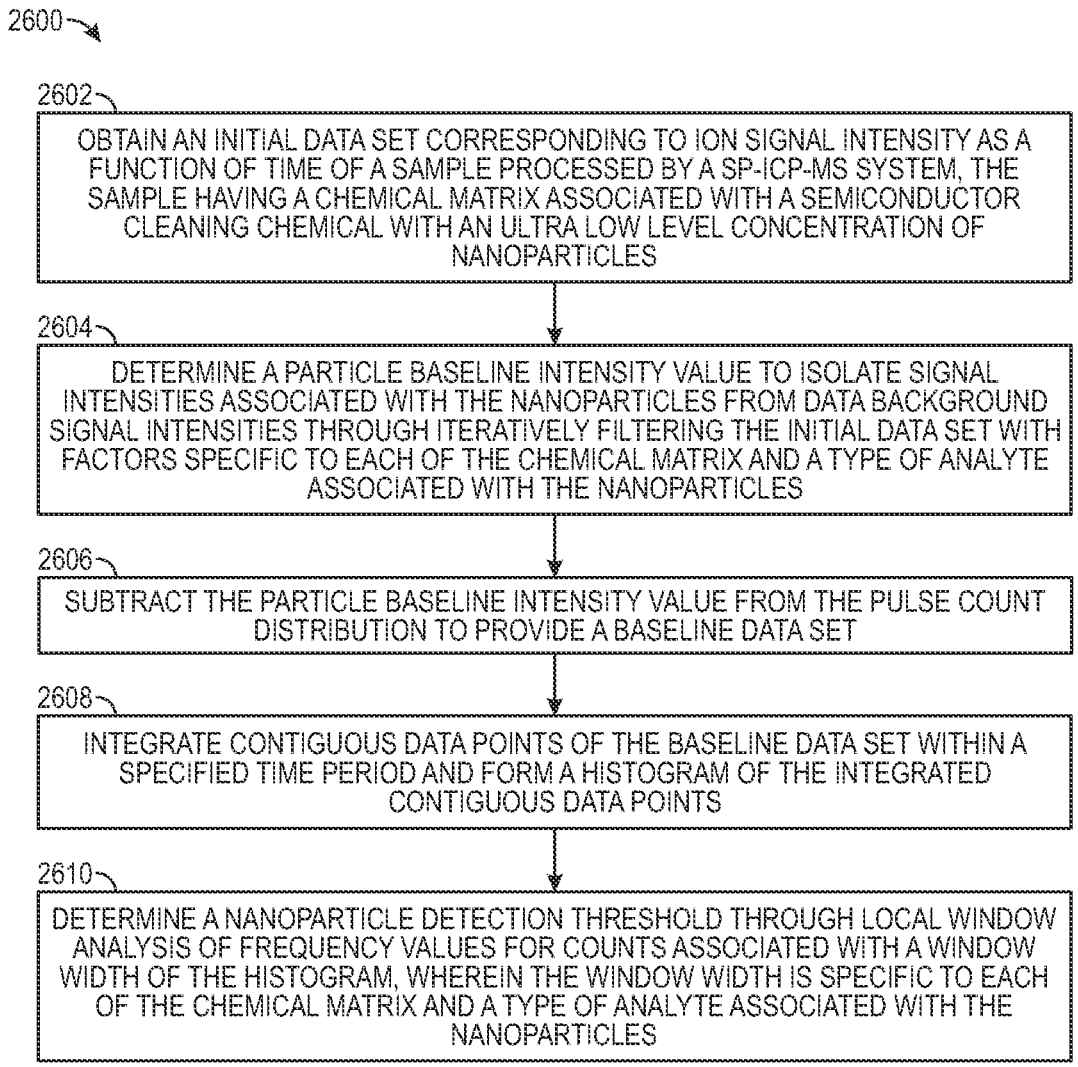
FIG. 26 is a flow diagram for a method for analyzing ultra-low level concentration nanoparticles in semiconductor cleaning chemicals by single particle inductively coupled plasma mass spectrometry (spICP-MS) in accordance with example implementations of the present disclosure.

Referring to FIG. 26, a method 2600 of analyzing ultra-low level concentration mass spectrometry (spICP-MS) is shown in accordance with example implementations of the present disclosure. The method 2600 includes obtaining an initial data set corresponding to ion signal intensity as a function of time of a sample processed by a spICP-MS system, the sample having a chemical matrix associated with a semiconductor cleaning chemical with an ultra-low level concentration of nanoparticles in block 2602. For example, the controller 108 can receive or otherwise access analysis data from the sample analyzer 106. In implementations, the semiconducting cleaning chemicals can include, but are not limited to, isopropyl alcohol, hydrogen peroxide, ammonium hydroxide, sulfuric acid, hydrofluoric acid, and combinations thereof. The method 2600 also includes determining a particle baseline intensity value to isolate signal intensities associated with the nanoparticles from data background signal intensities through iteratively filtering the initial data set with factors specific to each of the chemical matrix and a type of analyte associated with the nanoparticles in block 2604. For example, the particle baseline intensity value can be determined according to the process 300 described herein for iterative determination of outlier data from the spectrometry data set received from the sample analyzer 106 to determine particle baseline. The factors specific to each of the chemical matrix and a type of analyte associated with the nanoparticles can include, but are not limited to, the multiple of the iterative sigma used in the process 300 that is specific to each of the chemical matrix and a type of analyte associated with the nanoparticles, the multiple of the final baseline sigma used in the process 300 that is specific to each of the chemical matrix and a type of analyte associated with the nanoparticles, and combinations thereof In implementations, iteratively filtering the dataset from block 2604 can include determining a pulse count distribution of the initial data set corresponding to a plurality of data points, each data point corresponding to an ion signal intensity and a frequency of the ion signal intensity detected by the spICP-MS system. In implementations, iteratively filtering the dataset from block 2604 can include iteratively removing from the pulse count distribution pulse count data points that exceed a particle threshold value associated with a sum of a first multiple of an average of the pulse count distribution and a first multiple of a standard deviation of the pulse count distribution, wherein subsequent iterations adjust the particle threshold value based on the removed pulse count data points until no pulse count data points exceed the particle threshold value to provide a resultant pulse count distribution, wherein the particle baseline intensity value corresponds to a sum of a second multiple of an average of the resultant pulse count distribution and a second multiple of a standard deviation of the resultant pulse count distribution, and wherein each of the first multiple of the average, the first multiple of the standard deviation, the second multiple of the average, and the second multiple of the standard deviation are specific to each of the chemical matrix and a type of analyte associated with the nanoparticles. In implementations, the first multiple of a standard deviation of the pulse count distribution is the multiple of the iterative sigma used in the process 300 that is specific to each of the chemical matrix and a type of analyte associated with the nanoparticles and the second multiple of a standard deviation of the resultant pulse count distribution is the multiple of the final baseline sigma used in the process 300 that is specific to each of the chemical matrix and a type of analyte associated with the nanoparticles.

The method 2600 also includes subtracting the particle baseline intensity value from the pulse count distribution to provide a baseline data set in block 2606. For example, the controller 108 can implement the process 1100 to subtract the particle baseline intensity value determined from process 300 from the pulse count distribution to provide a baseline data set. The method 2600 also includes integrating contiguous data points of the baseline data set within a specified time period and forming a histogram of the integrated contiguous data points in block 2608. Example histograms are discussed herein with respect to FIGS. 12A through 14. The method 2600 further includes determining a nanoparticle detection threshold through local window analysis of frequency values for counts associated with a window width of the histogram, wherein the window width is specific to each of the chemical matrix and a type of analyte associated with the nanoparticles in block 2610. For example, the controller 108 can implement the process 1100 to determine a nanoparticle detection threshold using window widths that are specific to each of the chemical matrix and a type of analyte associated with the nanoparticles.

As described herein, the multiple of the iterative sigma used in the process 300, the multiple of the final baseline sigma used in the process 300, and the window widths used in the process 1100 depend on each of the chemical matrix and a type of analyte associated with the nanoparticles under analysis and were determined to be critical in the analysis of ultra-low level concentration mass spectrometry (spICP-MS). The analyte of interest can include, but is not limited to, sodium, magnesium, aluminum, silicon, calcium, chromium, iron, nickel, copper, gold, and combinations thereof with the analysis process utilizing a standard reference nanoparticle including, but not limited to, iron (e.g., 20 nm Fe), gold (e.g., 20 nm Au), silicon (e.g., 100 nm Si, 200 nm, Si), and combinations thereof. The chemical matrix supporting the nanoparticles can include, but is not limited to, isopropyl alcohol, hydrogen peroxide, ammonium hydroxide, sulfuric acid, hydrofluoric acid, and combinations thereof. In implementations, the multiple of the iterative sigma used in the process 300, the multiple of the final baseline sigma used in the process 300, and the window widths used in the process 1100 are based on the combination of the chemical matrix and analyte of interest provided according to FIG. 27, wherein the numeric convention of X, Y, Z for a given analyte row and chemical matrix column stands for a multiple of X for the iterative sigma used in the process 300, a multiple of Y for the final baseline sigma used in the process 300, and a window width of Z used in the process 1100 for that particular analyte/matrix combination.

In implementations, determining a particle baseline intensity value from block 2604 of the method 2600 includes determining a level of ionic contamination in the sample. In implementations, the method 2600 can further include determining, for one or more operational modes of the spICP-MS system, an identity of an analyte of interest in the sample. In implementations, the method 2600 can further include determining, independent of an analyte of interest in the sample, a minimum particle size for data above the nanoparticle detection threshold.

In implementations, the nanoparticle detection threshold of the method 2600 separates an ionic signal portion from a nanoparticle signal portion in the histogram and is associated with the lowest frequency value point in the histogram. In implementations, the method 2600 can further include determining, for data above the nanoparticle detection threshold, one or more of a particle concentration, a particle elemental composition, a particle size, a particle size distribution through association with one or more of a mass fraction of an analyte of interest in the sample and a density of the analyte of interest in the sample, a transport efficiency of a standard reference, and a response factor (e.g., sensitivity) of an analyte of interest in a matrix.

In implementations, obtaining an initial data set corresponding to ion signal intensity as a function of time of a sample processed by a spICP-MS system from block 2602 of method 2600 includes obtaining an initial data set corresponding to ion signal intensity as a function of time of a sample processed by a spICP-MS system for a first analysis duration, wherein the first analysis duration is less than about three minutes. Additionally, obtaining an initial data set corresponding to ion signal intensity as a function of time of a sample processed by a spICP-MS system from block 2602 of method 2600 can also include obtaining a second data set corresponding to ion signal intensity as a function of time of the sample processed by the spICP-MS system for a second analysis duration, wherein the second analysis duration is from about fifteen minutes to about thirty minutes. The second analysis duration can include, but is not limited to, a single duration of an analysis of a sample or an aggregate analysis duration of independent analyses of the same sample.

In implementations, the method 2600 can further include obtaining, via a processor in a computing device, a plurality of data sets corresponding to ion signal intensity as a function of time of the sample processed by a spICP-MS system; aggregating the plurality of data sets to provide an aggregated data set; and determining, for the aggregated data set, the particle baseline intensity value. In implementations, the method 2600 can further include obtaining, via a processor in a computing device, a plurality of data sets corresponding to ion signal intensity as a function of time of the sample processed by a spICP-MS system; aggregating the plurality of data sets to provide an aggregated data set; and determining, for the aggregated data set, the nanoparticle detection threshold.

In implementations, the method 2600 can further include determining, for data above the nanoparticle detection threshold, a number of particles of an analyte of interest per unit of volume dependent on a volume of the sample processed by the spICP-MS system. For example, the volume of the sample processed by the spICP-MS system can be determined through a total time of measurement of the sample at the spICP-MS and a sample injection flow rate into the spICP-MS.

In implementations, the method 2600 can further include determining, for data above the nanoparticle detection threshold, a particle size of an analyte of interest of the sample, wherein the particle size is detectable for a cool mode operational mode of the spICP-MS of at least 5 nm. For example, the cool mode operational mode of the spICP-MS can include supplying the spICP-MS with a power of about 950 W. In implementations, the method 2600 can further include determining, for data above the nanoparticle detection threshold, a particle size of silicon in the sample, wherein the particle size is detectable for a hot mode operational mode of the spICP-MS of at least 50 nm. For example, the hot mode operational mode of the spICP-MS can include supplying the spICP-MS with a power of about 1600 W. In implementations, the method 2600 can further include determining, for data above the nanoparticle detection threshold, a particle size of gold in the sample, wherein the particle size is detectable for a hot mode operational mode of the spICP-MS of at least 20 nm. For example, the hot mode operational mode of the spICP-MS can include supplying the spICP-MS with a power of about 1600 W.

In implementations, the analyte of method 2600 is present in the sample at an ultra-low concentration and includes one or more of sodium, magnesium, aluminum, silicon, calcium, chromium, iron, nickel, copper, and gold. For example, the ultra-low concentration includes concentrations of gold up to about 300 particles per mL of matrix (e.g., 300 ea/mL), concentrations of iron up to about 760 particles per mL of matrix (e.g., 760 ea/mL), concentrations of silicon up to about 310 particles per mL of matrix (e.g., 310 ea/mL), or the like. Additionally, the chemical matrix of method 2600 can include one or more of isopropyl alcohol, hydrogen peroxide, ammonium hydroxide, sulfuric acid, and hydrofluoric acid.

In implementations, obtaining an initial data set corresponding to ion signal intensity as a function of time of a sample processed by a spICP-MS of block 2602 of method 2600 includes obtaining an initial data set corresponding to ion signal intensity as a function of time of a sample processed by a spICP-MS system for a first analysis duration, and the method 2600 further includes monitoring a trend of a concentration of an analyte of interest present in the sample. For example, the method 2600 can include determining whether the trend of the concentration is in indicative of a potential metallic contamination in the sample; and when it is determined that the trend of the concentration is in indicative of a potential nanoparticle contamination in the sample, obtaining a second data set corresponding to ion signal intensity as a function of time of the sample processed by the spICP-MS system for a second analysis duration, the second analysis duration being longer than the first analysis duration. Additionally or alternatively, the method 2600 can include generating an alert when one or more characteristics of the second data set meets or exceeds a detection limit threshold relative to one or more characteristics of the trend of the concentration.

In implementations, a system controller having a computer processor can perform a portion or all of the steps of method 2600. The system controller can be integrated with the spICP-MS system, separate from the spICP-MS system (e.g., communicatively coupled via network connection, data connection, or the like), or combinations thereof.

Figures 27, 28:
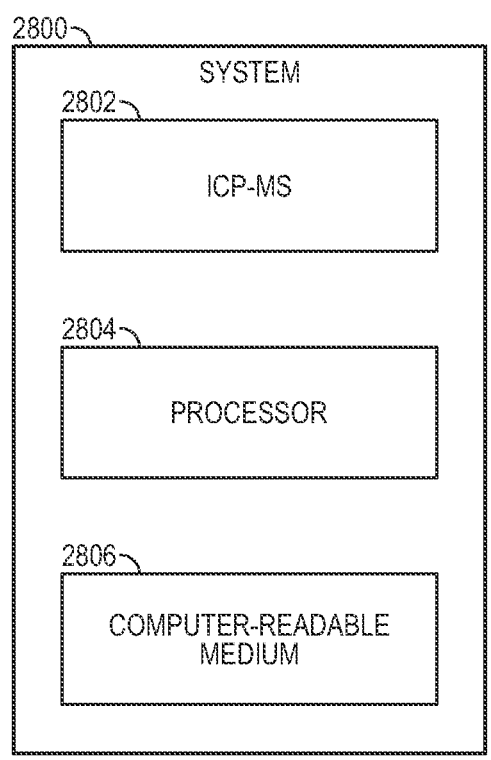
FIG. 27 is a table illustrating process variables as they relate to specific combinations of analytes of interest and chemical matrices for analyzing ultra-low level concentration nanoparticles in semiconductor cleaning chemicals by single particle inductively coupled plasma mass spectrometry (spICP-MS) in accordance with example implementations of the present disclosure.
FIG. 28 is a schematic illustration of a system for analyzing ultra-low level concentration nanoparticles in semiconductor cleaning chemicals by spICP-MS in accordance with example implementations of the present disclosure.

Referring to FIG. 28, a system 2800 for analyzing ultra-low level concentration nanoparticles in semiconductor cleaning chemicals by spICP-MS is shown in accordance with example implementations of the present disclosure. The system 2800 generally includes an ICP-MS 2802, a processor 2804, and a non-transitory computer-readable medium 2806. The ICP-MS 2802 is configured to generate an initial data set corresponding to ion signal intensity as a function of time of a sample processed by the ICP-MS, where the sample has a chemical matrix associated with a semiconductor cleaning chemical with an ultra-low level concentration of nanoparticles. The processor 2804 is communicatively coupled to, integrated with, or combinations thereof, one or more components of the system 2800. The non-transitory computer-readable medium 2806 bears one or more instructions for execution on the processor 2804 to cause the processor 2804 to perform the method 2600.

Electromechanical devices (e.g., electrical motors, servos, actuators, or the like) may be coupled with or embedded within the components of the system 100, the system 2800, or a combination of systems described herein to facilitate automated operation via control logic embedded within or externally driving the system. The electromechanical devices can be configured to cause movement of devices and fluids according to various procedures, such as the procedures described herein (e.g., process 300, process 1100, method 2600). The system may include or be controlled by a computing system having a processor or other controller configured to execute computer readable program instructions (i.e., the control logic) from a non-transitory carrier medium (e.g., storage medium such as a flash drive, hard disk drive, solid-state disk drive, SD card, optical disk, or the like). The computing system can be connected to various components of the system, either by direct connection, or through one or more network connections (e.g., local area networking (LAN), wireless area networking (WAN or WLAN), one or more hub connections (e.g., USB hubs), and so forth). For example, the computing system can be communicatively coupled to the system controller, ICP-MS, fluid handling systems (e.g., valves, pumps, etc.), other components described herein, components directing control thereof, or combinations thereof.

It should be recognized that the various functions, control operations, processing blocks, or steps described throughout the present disclosure may be carried out by any combination of hardware, software, or firmware. In some embodiments, various steps or functions are carried out by one or more of the following: electronic circuitry, logic gates, multiplexers, a programmable logic device, an application-specific integrated circuit (ASIC), a controller/microcontroller, or a computing system. A computing system may include, but is not limited to, a personal computing system, a mobile computing device, mainframe computing system, a workstation, image computer, parallel processor, or any other device known in the art. In general, the term "computing system" is broadly defined to encompass any device having one or more processors or other controllers, which execute instructions from a carrier medium.

Program instructions implementing functions, control operations, processing blocks, or steps, such as those manifested by embodiments described herein, may be transmitted over or stored on carrier medium. The carrier medium may be a transmission medium, such as, but not limited to, a wire, cable, or wireless transmission link. The carrier medium may also include a non-transitory signal bearing medium or storage medium such as, but not limited to, a read-only memory, a random access memory, a magnetic or optical disk, a solid-state or flash memory device, or a magnetic tape.

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

The invention claimed is:

1. A method for analyzing ultra-low level concentration nanoparticles in semiconductor cleaning chemicals by single particle inductively coupled plasma mass spectrometry (spICP-MS), the method comprising:

obtaining, via a processor in a computing device, an initial data set corresponding to ion signal intensity as a function of time of a sample processed by a spICP-MS system, the sample having a chemical matrix associated with a semiconductor cleaning chemical with an ultra-low level concentration of nanoparticles;

determining, via the processor, a particle baseline intensity value to isolate signal intensities associated with the nanoparticles from data background signal intensities through iteratively filtering the initial data set, wherein iteratively filtering the dataset includes:

determining, via the processor, a pulse count distribution of the initial data set corresponding to a plurality of data points, each data point corresponding to an ion signal intensity and a frequency of the ion signal intensity detected by the spICP-MS system; and iteratively removing from the pulse count distribution pulse count, via the processor, data points that exceed a particle threshold value associated with a sum of a first multiple of an average of the pulse count distribution and a first multiple of a standard deviation of the pulse count distribution, wherein subsequent iterations adjust the particle threshold value based on the removed pulse count data points until no pulse count data points exceed the particle threshold value to provide a resultant pulse count distribution, wherein the particle baseline intensity value corresponds to a sum of a second multiple of an average of the resultant pulse count distribution and a second multiple of a standard deviation of the resultant pulse count distribution, wherein each of the first multiple of the average, the first multiple of the standard deviation, the second multiple of the average, and the second multiple of the standard deviation are specific to each of the chemical matrix and a type of analyte associated with the nanoparticles;

subtracting, via the processor, the particle baseline intensity value from the pulse count distribution to provide a baseline data set;

integrating, via the processor, contiguous data points of the baseline data set within a specified time period and forming a histogram of the integrated contiguous data points; and determining, via the processor, a nanoparticle detection threshold through local window analysis of frequency values for counts associated with a window width of the histogram, wherein the window width is specific to each of the chemical matrix and a type of analyte associated with the nanoparticles.

2. The method of claim 1, wherein determining, via the processor, a particle baseline intensity value includes determining a level of ionic contamination in the sample.

3. The method of claim 1, further comprising:
determining, for one or more operational modes of the spICP-MS system, an identity of an analyte of interest in the sample.

4. The method of claim 1, further comprising:
determining, independent of an analyte of interest in the sample, a minimum particle size for data above the nanoparticle detection threshold.

5. The method of claim 1, wherein the nanoparticle detection threshold separates an ionic signal portion from a nanoparticle signal portion in the histogram and is associated with the lowest frequency value point in the histogram.

6. The method of claim 1, further comprising:
determining, for data above the nanoparticle detection threshold, one or more of a particle concentration, a particle elemental composition, a particle size, and a particle size distribution through association with one or more of a mass fraction of an analyte of interest in the sample and a density of the analyte of interest in the sample.

7. The method of claim 1, wherein obtaining an initial data set corresponding to ion signal intensity as a function of time of a sample processed by a spICP-MS system includes:
obtaining an initial data set corresponding to ion signal intensity as a function of time of a sample processed by a spICP-MS system for a first analysis duration, wherein the first analysis duration is less than about three minutes.

8. The method of claim 7, further comprising obtaining a second data set corresponding to ion signal intensity as a function of time of the sample processed by the spICP-MS system for a second analysis duration, wherein the second analysis duration is from about fifteen minutes to about thirty minutes.

9. The method of claim 1, further comprising:
obtaining, via a processor in a computing device, a plurality of data sets corresponding to ion signal intensity as a function of time of the sample processed by a spICP-MS system;
aggregating the plurality of data sets to provide an aggregated data set; and
determining, for the aggregated data set, the particle baseline intensity value.

10. The method of claim 1, further comprising:
obtaining, via a processor in a computing device, a plurality of data sets corresponding to ion signal intensity as a function of time of the sample processed by a spICP-MS system;
aggregating the plurality of data sets to provide an aggregated data set; and
determining, for the aggregated data set, the nanoparticle detection threshold.

11. The method of claim 1, further comprising:
determining, for data above the nanoparticle detection threshold, a number of particles of an analyte of interest per unit of volume dependent on a volume of the sample processed by the spICP-MS system.

12. The method of claim 11, wherein the volume of the sample processed by the spICP-MS system is determined through a total time of measurement of the sample at the spICP-MS and a sample injection flow rate into the spICP-MS.

13. The method of claim 1, further comprising:
determining, for data above the nanoparticle detection threshold, a particle size of an analyte of interest of the sample, wherein the particle size is detectable for a cool mode operational mode of the spICP-MS of at least 5 nm.

14. The method of claim 1, further comprising:
determining, for data above the nanoparticle detection threshold, a particle size of silicon in the sample, wherein the particle size is detectable for a hot mode operational mode of the spICP-MS of at least 50 nm.

15. The method of claim 1, further comprising:
determining, for data above the nanoparticle detection threshold, a particle size of gold in the sample, wherein the particle size is detectable for a hot mode operational mode of the spICP-MS of at least 20 nm.

16. The method of claim 1, wherein the analyte of interest is present in the sample at an ultra-low concentration and includes one or more of sodium, magnesium, aluminum, silicon, calcium, chromium, iron, nickel, copper, and gold, and wherein the chemical matrix includes one or more of isopropyl alcohol, hydrogen peroxide, ammonium hydroxide, sulfuric acid, and hydrofluoric acid.

17. The method of claim 1, wherein obtaining an initial data set corresponding to ion signal intensity as a function of time of a sample processed by a spICP-MS system includes:
obtaining an initial data set corresponding to ion signal intensity as a function of time of a sample processed by a spICP-MS system for a first analysis duration, and wherein the method further comprises:
monitoring a trend of a concentration of an analyte of interest present in the sample.

18. The method of claim 17, further comprising:
determining whether the trend of the concentration is in indicative of a potential metallic contamination in the sample; and
when it is determined that the trend of the concentration is in indicative of a potential metallic contamination in the sample, obtaining a second data set corresponding to ion signal intensity as a function of time of the sample processed by the spICP-MS system for a second analysis duration, the second analysis duration being longer than the first analysis duration.

19. The method of claim 18, further comprising:
generating an alert when one or more characteristics of the second data set meets or exceeds a detection limit threshold relative to one or more characteristics of the trend of the concentration.

20. An article of manufacture, comprising:
a non-transitory computer-readable medium bearing one or more instructions for execution on a computing device processor to cause the computing device processor to perform the method of claim 1.

21. A system for analyzing ultra-low level concentration nanoparticles in semiconductor cleaning chemicals by single particle inductively coupled plasma mass spectrometry (spICP-MS), comprising:
an inductively coupled plasma mass spectrometer (ICP-MS) configured to generate an initial data set corresponding to ion signal intensity as a function of time of a sample processed by the ICP-MS, the sample having a chemical matrix associated with a semiconductor cleaning chemical with an ultra-low level concentration of nanoparticles;
a processor; and
a non-transitory computer-readable medium bearing one or more instructions for execution on the processor to cause the processor to perform the method of claim 1.

* * * * *